(12) United States Patent
Shi et al.

(10) Patent No.: US 9,479,071 B2
(45) Date of Patent: Oct. 25, 2016

(54) MULTILEVEL CONVERTER AND POWER SUPPLY SYSTEM

(71) Applicant: Huawei Technologies Co., Ltd., Shenzhen (CN)

(72) Inventors: Lei Shi, Shanghai (CN); Yunfeng Liu, Shanghai (CN); Yanshen Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 60 days.

(21) Appl. No.: 14/662,708

(22) Filed: Mar. 19, 2015

(65) Prior Publication Data
US 2015/0270789 A1    Sep. 24, 2015

(30) Foreign Application Priority Data

Mar. 19, 2014 (CN) .......................... 2014 1 0102712

(51) Int. Cl.
| | |
|---|---|
| H02M 7/493 | (2007.01) |
| H02M 3/335 | (2006.01) |
| H02M 7/487 | (2007.01) |
| H02M 7/49  | (2007.01) |
| H02M 1/12  | (2006.01) |
| H02M 1/00  | (2006.01) |

(52) U.S. Cl.
CPC ......... *H02M 3/33569* (2013.01); *H02M 7/487* (2013.01); *H02M 7/49* (2013.01); *H02M 7/493* (2013.01); *H02M 1/126* (2013.01); *H02M 2001/0064* (2013.01); *H02M 2001/0077* (2013.01)

(58) Field of Classification Search
CPC ...... H02M 7/487; H02M 7/49; H02M 7/493; H02M 3/156; H02M 3/285; H02M 3/335; H02M 3/33507; H02M 3/33569; H02M 2001/0064; H02M 2001/0077; H02M 1/126
USPC .................. 363/71, 73–80, 95, 98, 131, 132
See application file for complete search history.

(56) References Cited

U.S. PATENT DOCUMENTS

| | | | |
|---|---|---|---|
| 6,545,450 B1 * | 4/2003 | Ledenev ................... | G06F 1/26 323/272 |
| 2008/0074911 A1 * | 3/2008 | Petter ...................... | H02M 1/14 363/65 |
| 2014/0152413 A1 * | 6/2014 | Fu .......................... | H02M 7/493 336/192 |
| 2015/0062984 A1 * | 3/2015 | Hu .......................... | H02M 1/12 363/71 |

* cited by examiner

*Primary Examiner* — Yemane Mehari
(74) *Attorney, Agent, or Firm* — Conley Rose, P.C.; Grant Rodolph; Nicholas K. Beaulieu

(57) ABSTRACT

A multilevel converter includes at least one converting unit, where the converting unit includes N interleaved parallel bridge arms which enable the converting unit to output $2[(M-1\times)N]+1$ level signals, where N is an integer greater than or equal to 3, M is the number of levels received by the converting unit, and M is an integer greater than or equal to 3; a direct current inputting unit that supplies the direct current to the converting unit; a voltage dividing unit, where an input end of the voltage dividing unit is connected to an output of the direct current inputting unit, and an output end of the voltage dividing unit is connected to an input end of the converting unit; and at least one filtering unit, where the filtering unit is connected to the converting unit to output an alternating current.

14 Claims, 15 Drawing Sheets

5-a

US 9,479,071 B2

MULTILEVEL CONVERTER AND POWER SUPPLY SYSTEM

CROSS-REFERENCE TO RELATED APPLICATION

This application claims priority to Chinese Patent Application No. 201410102712.4, filed on Mar. 19, 2014, which is hereby incorporated by reference in its entirety.

TECHNICAL FIELD

The present invention relates to the field of power electronics, and in particular, to a multilevel converter and a power supply system.

BACKGROUND

A multilevel converter is an apparatus for converting a direct current into an alternating current that presents multiple levels as time changes, an alternating current that presents multiple levels as time changes into a direct current, a direct current into a direct current, or an alternating current into an alternating current. The multilevel converter is mainly applied to fields such as speed regulation of a motor with a high voltage and large power, reactive power compensation, or active filtering. The alternating current generally refers to a sine wave or square wave of 220 Volts (V) and 50 Hertz (Hz), and the direct current may refer to direct current electrical energy provided by a battery, an accumulator jar, or the like.

The multilevel converter may implement output of three levels by using a diode-clamped T-type three-level topology, and may further implement output of a larger number of levels by adding a power semiconductor device on the basis of the diode-clamped T-type three-level topology or by using low-level topologies a serial connection. However, a whole topology of the multilevel converter has relatively high control logic complexity.

In the prior art, to decrease the control logic complexity of the whole topology of the multilevel converter, the multilevel converter may further implement output of three levels by connecting two two-level-input bridge arms in an interleaved parallel manner, and enabling, within a period of working time of the multilevel converter, switching transistors of the two interleaved parallel two-level-input bridge arms, to be connected or disconnected alternatively. In addition, each bridge arm is connected to a coupled inductor, and the coupled inductors are connected in series by connecting or disconnecting the switching transistors of the two bridge arms alternatively to implement filtering and ripple elimination for an output level signal, where each bridge arm includes two switching transistor. If the multilevel converter needs to implement output of a larger number of levels, more two-level-input bridge arms may be connected in an interleaved parallel manner on the basis of the two two-level-input bridge arms, so as to implement output of multiple levels, and implement filtering and ripple elimination for an output level signal together with the coupled inductor. However, when more two-level-input bridge arms are connected in an interleaved parallel manner to implement output of multiple levels, the number of connections between the bridge arms and the coupled inductor increases, for example, when four two-level-input bridge arms are connected in an interleaved parallel manner to implement output of seven levels, four connections are required for the four two-level-input bridge arms and the coupled inductor, thereby causing relatively high processing complexity of the coupled inductor and a relatively complex circuit structure.

SUMMARY

Embodiments of the present invention provide a multilevel converter and a power supply system, which can effectively reduce processing difficulty of a coupled inductor and simplify a circuit structure.

To achieve the foregoing objective, the following technical solutions are adopted in the embodiments of the present invention.

According to a first aspect, a multilevel converter is provided, including at least one converting unit, where the converting unit includes two multilevel bridge arm groups connected in parallel, and the two multilevel bridge arm groups include a first multilevel bridge arm group and a second multilevel bridge arm group, where each multilevel bridge arm group includes a bridge arm group and a coupled inductor, the bridge arm group is connected to the coupled inductor, and the coupled inductor is configured to filter a level signal output by the bridge arm group, where the bridge arm group includes at least N interleaved parallel bridge arms, and each bridge arm is connected to the coupled inductor, where N is an integer greater than or equal to 3; within a high frequency period, a phase of a high frequency drive signal of each bridge arm in the bridge arm group deviates, by 360/N degrees, from a phase of a high frequency drive signal of a bridge arm adjacent to each bridge arm, and a phase of a high frequency drive signal of each bridge arm in the first multilevel bridge arm group deviates, by 360/2N degrees, from a phase of a high frequency drive signal of a bridge arm that is in the second multilevel bridge arm group and corresponding to each bridge arm in the first multilevel arm group; and within a working frequency period, phases of high frequency drive signals of the two multilevel bridge arm groups that are connected in parallel deviate from each other by 180 degrees, so that phases of level signals output by the two multilevel bridge arm groups that are connected in parallel deviate from each other by 180 degrees, and then the converting unit is enabled to output 2[(M−1)×N]+1 level signals, where M is the number of levels received by the converting unit and M is an integer greater than or equal to 3; a direct current inputting unit configured to input a direct current and supply the direct current to the converting unit; a voltage dividing unit configured to divide the direct current supplied by the direct current inputting unit into a direct current with at least three levels, where an input end of the voltage dividing unit is connected to an output end of the direct current inputting unit and an output end of the voltage dividing unit is connected to an input end of each converting unit, and the output end of the voltage dividing unit is connected to an input end of each bridge arm in each converting unit; and at least one filtering unit configured to perform voltage transformation to transform the level signals output by the converting unit into an alternating current, and perform filtering on the alternating current and output the alternating current, where an input end of each filtering unit is connected to an output end of a different converting unit, and the filtering unit is connected to the converting unit in series.

With reference to the first aspect, in a first implementable manner, each bridge arm includes at least one switching manner, and the switching transistor is a power device.

With reference to the first implementable manner, in a second implementable manner, the filtering unit includes an isolation transformer and a capacitor, where the isolation transformer is configured to perform voltage transformation to transform the level signals output by the converting unit into the alternating current, and perform filtering, by using leakage inductance of the isolation transformer, on the level signals output by the converting unit and perform filtering on the alternating current by using the capacitor.

With reference to the first implementable manner, in a third implementable manner, the filtering unit includes an isolation transformer and a passive power filter, where the isolation transformer is configured to perform voltage transformation to transform the level signals output by the converting unit into the alternating current, and perform filtering, by using leakage inductance of the isolation transformer, on the level signals output by the converting unit and perform filtering on the alternating current by using the passive power filter.

According to a second aspect, a multilevel converter is provided, including at least one converting unit, where the converting unit includes two multilevel bridge arm groups connected in parallel, and the two multilevel bridge arm groups include a first multilevel bridge arm group and a second multilevel bridge arm group, where each multilevel bridge arm group includes a bridge arm group and a coupled inductor, the bridge arm group is connected to the coupled inductor, and the coupled inductor is configured to perform filtering on a level signal input to the bridge arm group, where the bridge arm group includes at least N interleaved parallel bridge arms, and each bridge arm is connected to the coupled inductor, where N is an integer greater than or equal to 3; within a high frequency period, a phase of a high frequency drive signal of each bridge arm in the bridge arm group deviates, by 360/N degrees, from a phase of a high frequency drive signal of a bridge arm adjacent to each bridge arm, and a phase of a high frequency drive signal of each bridge arm in the first multilevel bridge arm group deviates, by 360/2N degrees, from a phase of a high frequency drive signal of a bridge arm that is in the second multilevel bridge arm group and corresponding to each bridge arm in the first multilevel arm group; and within a working frequency period, phases of high frequency drive signals of the two multilevel bridge arm groups that are connected in parallel deviate from each other by 180 degrees, so that phases of level signals input to the two multilevel bridge arm groups that are connected in parallel deviate from each other by 180 degrees, and then transformation is performed on 2[(M−1)×N]+1 level signals received by the converting unit and a direct current with at least three levels is output, where M is the number of levels output by the converting unit and M is an integer greater than or equal to 3; an alternating current inputting unit configured to input an alternating current and supply the alternating current to the converting unit; at least one filtering unit configured to perform voltage transformation to transform the alternating current input by the alternating current inputting unit into a level signal, and perform filtering on the alternating current and output the level signal to the converting unit, where an input end of each filtering unit is connected to an output end of the alternating current inputting unit, an output end of each filtering unit is connected to an input end of a different converting unit, and the filtering unit is connected to the converting unit in series; a voltage dividing unit configured to transform the direct current with at least three levels that is output by the converting unit into a direct current with two levels, where an input end of the voltage dividing unit is connected to an output end of each converting unit, and the input end of the voltage dividing unit is connected to an output end of each bridge arm in each converting unit; and a direct current outputting unit configured to receive the direct current output by the voltage dividing unit and output the direct current, where an output end of the voltage dividing unit is connected to an input end of the direct current inputting unit.

With reference to the second aspect, in a first implementable manner, each bridge arm includes at least one switching transistor, and the switching transistor is a power device.

With reference to the first implementable manner, in a second implementable manner, the filtering unit includes an isolation transformer and a capacitor, where the isolation transformer is configured to perform voltage transformation to transform the alternating current input by the alternating current inputting unit into a level signal; and perform filtering on the level signal by using leakage inductance of the isolation transformer, perform filtering on the alternating current by using the capacitor, and output the level signal.

With reference to the first implementable manner, in a third implementable manner, the filtering unit includes an isolation transformer and a passive power filter, where the isolation transformer is configured to perform voltage transformation to transform the alternating current input by the alternating current inputting unit into a level signal; and perform filtering on the level signal by using leakage inductance of the isolation transformer, perform filtering on the alternating current by using the passive power filter, and output the level signal.

According to a third aspect, a power supply system is provided, including a load and at least any one of the multilevel converters mentioned above, where the multilevel converter is configured to convert an alternating current into a direct current or convert a direct current into an alternating current, so as to supply the direct current or the alternating current to the load.

Embodiments of the present invention provide a multilevel converter and a power supply system, where the multilevel converter includes at least one converting unit, where the converting unit includes two multilevel bridge arm groups connected in parallel, and the two multilevel bridge arm groups include a first multilevel bridge arm group and a second multilevel bridge arm group, where each multilevel bridge arm group includes a bridge arm group and a coupled inductor, the bridge arm group is connected to the coupled inductor, and the coupled inductor is configured to filter a level signal output by the bridge arm group, where the bridge arm group includes at least N interleaved parallel bridge arms, and each bridge arm is connected to the coupled inductor, where N is an integer greater than or equal to 3; within a high frequency period, a phase of a high frequency drive signal of each bridge arm in the bridge arm group deviates, by 360/N degrees, from a phase of a high frequency drive signal of a bridge arm adjacent to each bridge arm, and a phase of a high frequency drive signal of each bridge arm in the first multilevel bridge arm group deviates, by 360/2N degrees, from a phase of a high frequency drive signal of a bridge arm that is in the second multilevel bridge arm group and corresponding to each bridge arm in the first multilevel arm group; and within a working frequency period, phases of high frequency drive signals of the two multilevel bridge arm groups that are connected in parallel deviate from each other by 180 degrees, so that phases of level signals output by the two multilevel bridge arm groups that are connected in parallel deviate from each other by 180 degrees, and then the converting unit is enabled to output 2[(M−1)×N]+1 level signals, where M is the number of levels received by the converting unit and M is an integer greater than or equal to 3; a direct current inputting unit configured to input a direct current and supply the direct current to the converting unit; a voltage dividing unit configured to divide the direct current supplied by the direct current inputting unit into a direct current with at least three levels, where an input end of the voltage dividing unit is connected to an output end of the direct current inputting unit and an output end of the voltage dividing unit is connected to an input end of each converting unit, and the output end of the voltage dividing unit is connected to an input end of each bridge arm in each converting unit; and at least one filtering unit configured to perform voltage transformation to transform the level signals output by the converting unit into an alternating current, and perform filtering on the alternating current and output the alternating current, where an input end of each filtering unit is connected to an output end of a different converting unit, and the filtering unit is connected to the converting unit in series. In this way, two multilevel bridge arm groups connected in parallel output $2[(M-1)\times N]+1$ level signals by using the two multilevel bridge arm groups connected in parallel, where each multilevel bridge arm group includes a bridge arm group and a coupled inductor, and the bridge arm group is connected to the coupled inductor. Compared with the prior art, in a case in which the number of output level signals is the same, by using a multilevel bridge arm group, the present invention can effectively reduce processing difficulty of a coupled inductor and simplify a circuit structure.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description merely show some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1A:
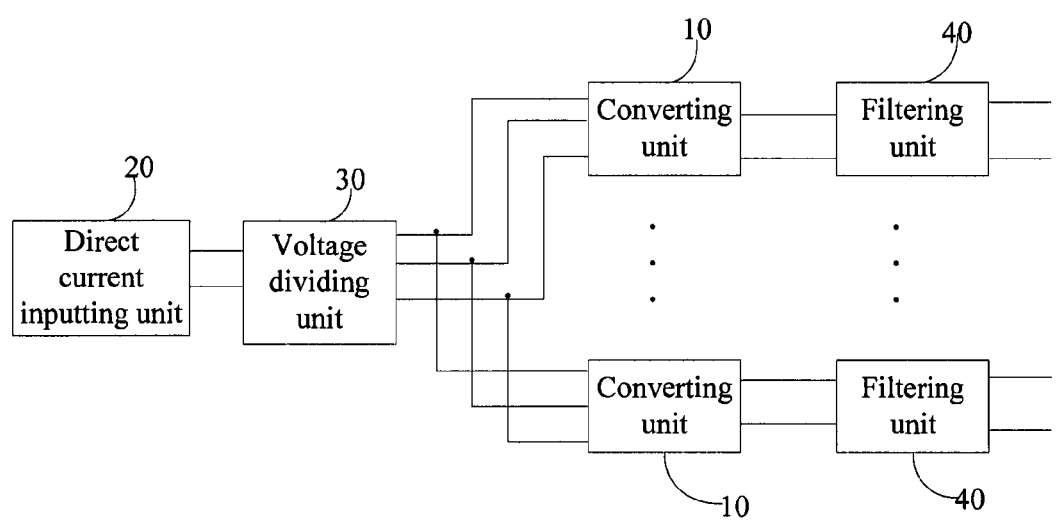
FIG. 1A is a schematic structural diagram of a multilevel converter according to an embodiment of the present invention.

An embodiment of the present invention provides a multilevel converter. As shown in FIG. 1A, the multilevel converter includes at least one converting unit 10, where the converting unit includes two multilevel bridge arm groups connected in parallel, and the two multilevel bridge arm groups include a first multilevel bridge arm group and a second multilevel bridge arm group, where each multilevel bridge arm group includes a bridge arm group and a coupled inductor, the bridge arm group is connected to the coupled inductor, and the coupled inductor is configured to filter a level signal output by the bridge arm group, where the bridge arm group includes at least N interleaved parallel bridge arms, and each bridge arm is connected to the coupled inductor, where N is an integer greater than or equal to 3; within a high frequency period, a phase of a high frequency drive signal of each bridge arm in the bridge arm group deviates, by 360/N degrees, from a phase of a high frequency drive signal of a bridge arm adjacent to each bridge arm, and a phase of a high frequency drive signal of each bridge arm in the first multilevel bridge arm group deviates, by 360/2N degrees, from a phase of a high frequency drive signal of a bridge arm that is in the second multilevel bridge arm group and corresponding to each bridge arm in the first multilevel arm group; and within a working frequency period, phases of high frequency drive signals of the two multilevel bridge arm groups that are connected in parallel deviate from each other by 180 degrees, so that phases of level signals output by the two multilevel bridge arm groups that are connected in parallel deviate from each other by 180 degrees, and then the converting unit is enabled to output 2[(M−1)×N]+1 level signals, where M is the number of levels received by the converting unit and M is an integer greater than or equal to 3; a direct current inputting unit 20 configured to input a direct current and supply the direct current to the converting unit 10; a voltage dividing unit 30 configured to divide the direct current supplied by the direct current inputting unit 20 into a direct current with at least three levels, where an input end of the voltage dividing unit 30 is connected to an output end of the direct current inputting unit 20 and an output end of the voltage dividing unit 30 is connected to an input end of each converting unit 10, and the output end of the voltage dividing unit 30 is connected to an input end of each bridge arm in each converting unit 10; and at least one filtering unit 40 configured to perform voltage transformation to transform the level signals output by the converting unit 10 into an alternating current, and perform filtering on the alternating current and output the alternating current, where an input end of each filtering unit 40 is connected to an output end of a different converting unit 10, and the filtering unit 40 is connected to the converting unit 10 in series.

Figure 1B:
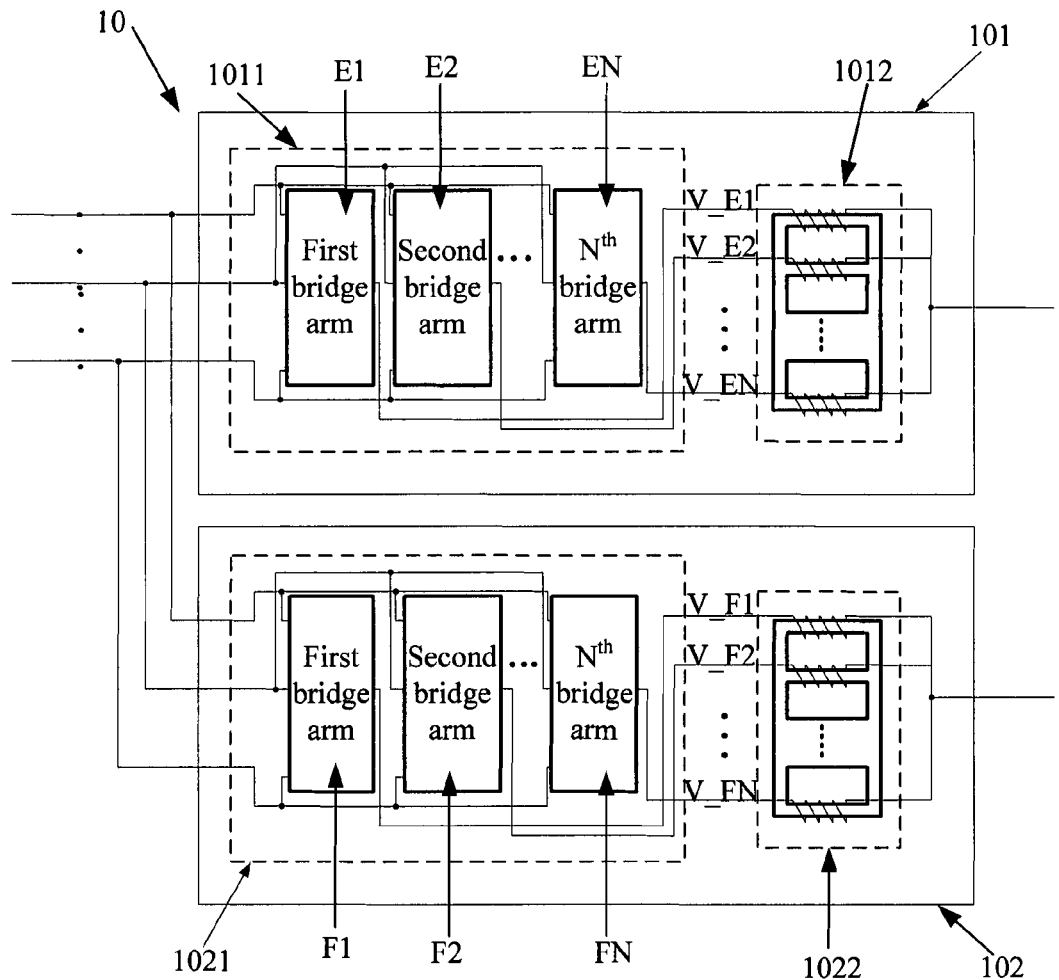
FIG. 1B is a schematic structural diagram of another multilevel converter according to an embodiment of the present invention.

As shown in FIG. 1B, the converting unit 10 includes two multilevel bridge arm groups connected in parallel, where the two multilevel bridge arm groups include a first multilevel bridge arm group 101 and a second multilevel bridge arm group 102. The two multilevel bridge arm groups connected in parallel have a same structure and devices at a same position have a same function.

The first multilevel bridge arm group 101 includes a bridge arm group 1011 and a coupled inductor 1012, the bridge arm group 1011 is connected to the coupled inductor 1012, and the coupled inductor 1012 is configured to filter a level signal output by the bridge arm group 1011. The bridge arm group 1011 includes at least N interleaved parallel bridge arms, and the N interleaved parallel bridge arms include a first bridge arm E1, a second bridge arm E2, and an N$^{th}$ bridge arm EN, where N is an integer greater than or equal to 3. The first bridge arm E1 is connected to the coupled inductor 1012 by using V_E1, the second bridge arm E2 is connected to the coupled inductor 1012 by using V_E2, and the N$^{th}$ bridge arm EN is connected to the coupled inductor 1012 by using V_EN.

Likewise, the second multilevel bridge arm group 102 includes a bridge arm group 1021 and a coupled inductor 1022, the bridge arm group 1021 is connected to the coupled inductor 1022, and the coupled inductor 1022 is configured to filter a level signal output by the bridge arm group 1021. The bridge arm group 1021 includes at least N interleaved parallel bridge arms, and the N interleaved parallel bridge arms include a first bridge arm F1, a second bridge arm F2, and an N$^{th}$ bridge arm FN, where N is an integer greater than or equal to 3. The first bridge arm F1 is connected to the coupled inductor 1022 by using V_F1, the second bridge arm F2 is connected to the coupled inductor 1022 by using V_F2, and the N$^{th}$ bridge arm FN is connected to the coupled inductor 1022 by using V_FN.

It should be noted that, within a high frequency period, a phase of a high frequency drive signal of each bridge arm in the bridge arm group 1011 deviates, by 360/N degrees, from a phase of a high frequency drive signal of a bridge arm adjacent to each bridge arm, a phase of a high frequency drive signal of each bridge arm in the bridge arm group 1021 deviates, by 360/N degrees, from a phase of a high frequency drive signal of a bridge arm adjacent to each bridge arm, and a phase of a high frequency drive signal of each bridge arm in the first multilevel bridge arm group 101 deviates, by 360/2N degrees, from a phase of a high frequency drive signal of a bridge arm that is in the second multilevel bridge arm group 102 and corresponding to each bridge arm in the first multilevel arm group 101; and within a working frequency period, a phase of a high frequency drive signal of the first multilevel bridge arm group 101 deviates from a phase of a high frequency drive signal of the second multilevel bridge arm group 102 by 180 degrees, so that phases of level signals output by the first multilevel bridge arm group 101 and the second multilevel bridge arm group 102 deviate from each other by 180 degrees, and then the converting unit is enabled to output 2[(M−1)×N]+1 level signals, where M is the number of levels received by the converting unit and M is an integer greater than or equal to 3.

In this way, two multilevel bridge arm groups connected in parallel output 2[(M−1)×N]+1 level signals by using the two multilevel bridge arm groups connected in parallel, where each multilevel bridge arm group includes a bridge arm group and a coupled inductor, and the bridge arm group is connected to the coupled inductor. Compared with the prior art, in a case in which the number of output level signals is the same, by using a multilevel bridge arm group, the present invention can effectively reduce processing difficulty of a coupled inductor and simplify a circuit structure.

It should be noted that each bridge arm includes at least one switching transistor, where the switching transistor is a power device, and the power device may be at least one of a metal-oxide-semiconductor field-effect transistor (MOSFET), an insulated gate bipolar transistor (IGBT), and an integrated gate commutated thyristor (IGCT), or a combination of different power devices. A switching transistor of each bridge arm is connected or disconnected according to a logical relationship of an on-off state of a switching transistor shown in table 1, so as to enable the bridge arm groups to output different level signals.

TABLE 1

Logical relationship of an on-off state of a switching transistor

| Q1 | Q2 | Q3 | Q4 |
|---|---|---|---|
| ON | ON | OFF | OFF |
| OFF | ON | ON | OFF |
| OFF | OFF | ON | ON |

The voltage dividing unit 30 includes multiple voltage dividing capacitors. The voltage dividing capacitors may be connected in series, and are configured to divide the direct current supplied by the direct current inputting unit 20 to the converting unit 10 into a direct current with at least three levels, so as to implement a three-level neutral point potential.

The filtering unit 40 may include an isolation transformer and a capacitor, where the isolation transformer is configured to perform voltage transformation to transform the level signals output by the converting unit 10 into the alternating current, and perform filtering, by using leakage inductance of the isolation transformer, on the level signals output by the converting unit 10 and perform filtering on the alternating current by using the capacitor.

The filtering unit 40 may also include an isolation transformer and a passive power filter, where the isolation transformer is configured to perform voltage transformation to transform the level signals output by the converting unit 10 into the alternating current, and perform filtering, by using leakage inductance of the isolation transformer, on the level signals output by the converting unit 10 and perform filtering on the alternating current by using the passive power filter. The passive power filter may be an inductor-capacitor (LC) filter.

In this way, filtering is performed, by using leakage inductance of a coupled inductor and leakage inductance of an isolation transformer, on level signals output by a converting unit, which increases power density of a multilevel converter and effectively reduces a cost of performing filtering on the level signals output by the converting unit. In addition, compared with the prior art, in a case in which bridge arm groups of the converting unit output a same number of levels, a bridge arm group and a coupled inductor in two multilevel bridge arm groups connected in parallel are relatively simple to be processed and suitable for mass production.

In a practical application, when one converting unit and one filtering unit are disposed in the multilevel converter, the multilevel converter may be applied to a single-phase inverter system, that is, the multilevel converter may be connected to a direct current power supply and converts an input direct current into an alternating current, so as to supply the alternating current to a load.

Figure 2:
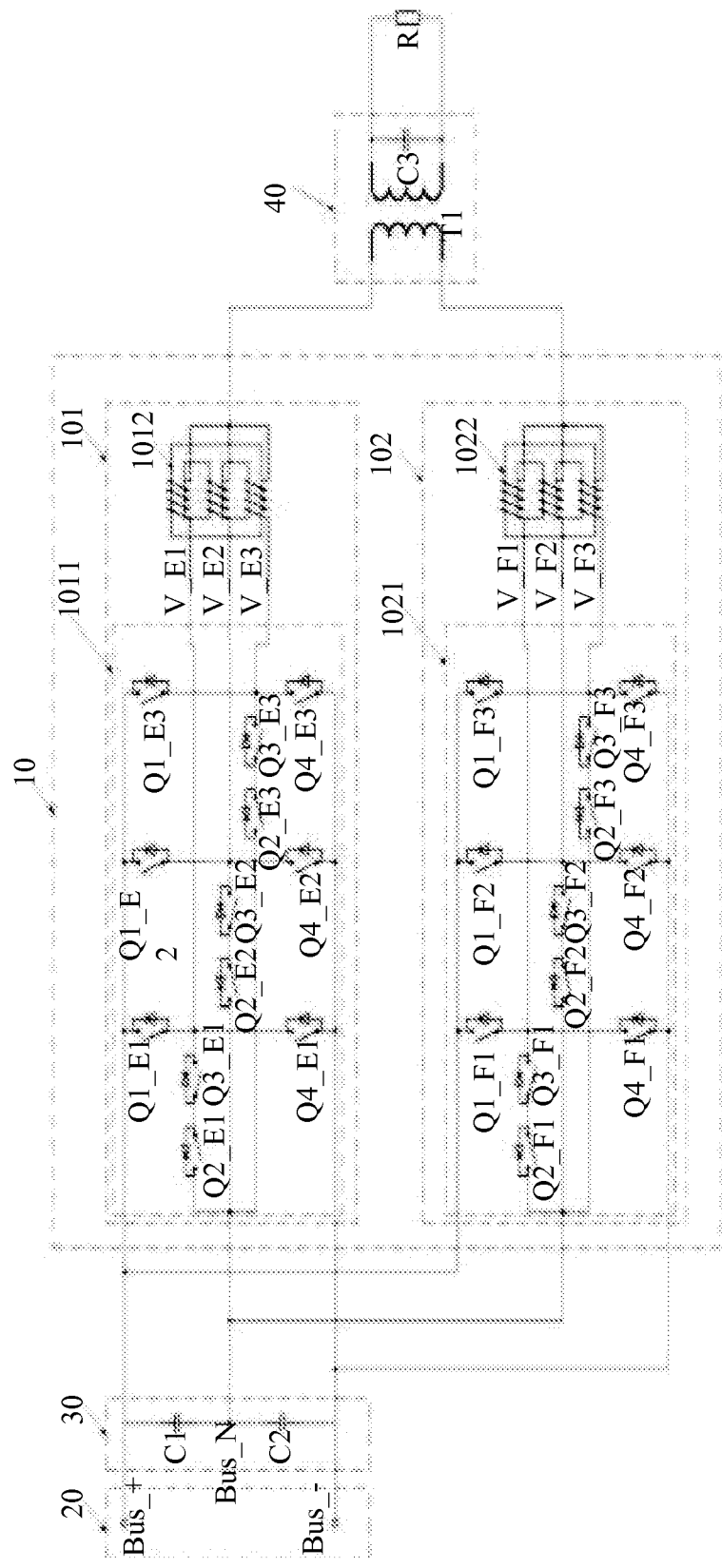
FIG. 2 is a schematic structural diagram of still another multilevel converter according to an embodiment of the present invention.

For example, assuming that one converting unit and one filtering unit are disposed in the multilevel converter in the embodiment of the present invention, M is 3, N is 3, and as shown in FIG. 2, the multilevel converter includes a direct current inputting unit 20 configured to input a direct current including Bus_+ and Bus_−; a voltage dividing unit 30, where the voltage dividing unit 30 includes a first voltage dividing capacitor C1 and a second voltage dividing capacitor C2, where the first voltage dividing capacitor C1 and the second voltage dividing capacitor C2 perform voltage division on a voltage input by the direct current inputting unit 20, so as to implement a three-level neutral point potential, that is, Bus_N is 0V; and an input end of the voltage dividing unit 30 is connected to an output end of the direct current inputting unit 20; a converting unit 10, where the converting unit 10 includes a first multilevel bridge arm group 101 and a second multilevel bridge arm group 102, where the first multilevel bridge arm group 101 and the second multilevel bridge arm group 102 are connected in parallel, two multilevel bridge arm groups connected in parallel have a same structure and devices at a same position have a same function, and an input end of the converting unit 10 is connected to an output end of the voltage dividing unit 30, where the first multilevel bridge arm group 101 includes a bridge arm group 1011 and a coupled inductor 1012, and the bridge arm group 1011 includes a first bridge arm E1, a second bridge arm E2, and a third bridge arm E3, where the first bridge arm E1 includes a first switching transistor Q1_E1, a second switching transistor Q2_E1, a third switching transistor Q3_E1, and a fourth switching transistor Q4_E1; the second bridge arm E2 includes a first switching transistor Q1_E2, a second switching transistor Q2_E2, a third switching transistor Q3_E2, and a fourth switching transistor Q4_E2; the third bridge arm E3 includes a first switching transistor Q1_E3, a second switching transistor Q2_E3, a third switching transistor Q3_E3, and a fourth switching transistor Q4_E3; the first bridge arm E1, the second bridge arm E2, and the third bridge arm E3 are connected in an interleaved parallel manner; and the first bridge arm E1 is connected to the coupled inductor 1012 by using V_E1, the second bridge arm E2 is connected to the coupled inductor 1012 by using V_E2, the third bridge arm E3 is connected to the coupled inductor 1012 by using V_E3, and filtering is performed, by using leakage inductance of the coupled inductor 1012, on a level signal output by the bridge arm group 1011; the second multilevel bridge arm group 102 includes a bridge arm group 1021 and a coupled inductor 1022, and the bridge arm group 1021 includes a first bridge arm F1, a second bridge arm F2, and a third bridge arm F3, where the first bridge arm F1 includes a first switching transistor Q1_F1, a second switching transistor Q2_F1, a third switching transistor Q3_F1, and a fourth switching transistor Q4_F1; the second bridge arm F2 includes a first switching transistor Q1_F2, a second switching transistor Q2_F2, a third switching transistor Q3_F2, and a fourth switching transistor Q4_F2; the third bridge arm F3 includes a first switching transistor Q1_F3, a second switching transistor Q2_F3, a third switching transistor Q3_F3, and a fourth switching transistor Q4_F3; the first bridge arm F1, the second bridge arm F2, and the third bridge arm F3 are connected in an interleaved parallel manner; and the first bridge arm F1 is connected to the coupled inductor 1022 by using V_F1, the second bridge arm F2 is connected to the coupled inductor 1022 by using V_F2, the third bridge arm F3 is connected to the coupled inductor 1022 by using V_F3, and filtering is performed, by using leakage inductance of the coupled inductor 1022, on a level signal output by the bridge arm group 1021; and a filtering unit 40 configured to transform level signals output by the converting unit 10 into an alternating current and output the alternating current, where an input end of the filtering unit 40 is connected to an output end of the converting unit 10, and the filtering unit 40 may include an isolation transformer T1 and a capacitor C3; and it should be noted that the filtering unit 40 may also include an isolation transformer and an LC filter, and when performing voltage transformation on level signals output by the output end of the converting unit 10, the isolation transformer performs filtering, by using leakage inductance of the isolation transformer, on the level signals output by the converting unit and perform filtering on the alternating current by using the capacitor C3 or the LC filter, which effectively reduces a filtering cost of the filtering unit.

It should be noted that the filtering unit 40 is further connected to a load R, and an output voltage of the filtering unit 40 supplies electrical energy to the load R.

The direct current inputting unit inputs the direct current including Bus_+ and Bus_−, the first voltage dividing capacitor C1 and the second voltage dividing capacitor C2 perform voltage division on a voltage difference VBus between Bus_+ and Bus_− that are input by the direct current inputting unit, so as to implement a three-level neutral point potential, that is, Bus_N is 0V, and then at least one level of Bus_+, Bus_−, and Bus_N is supplied to the converting unit, that is, Bus_+ is VBus/2, and Bus_− is −VBus/2.

According to a logical relationship of an on-off state of a switching transistor, in the first multilevel bridge arm group, when the first switching transistor Q1_E1 of the first bridge arm E1 in the bridge arm group is connected, the second switching transistor Q2_E1 is on, and the third switching transistor Q3_E1 and the fourth switching transistor Q4_E1 are in a disconnection state. When the second switching transistor Q2_E1 of the first bridge arm E1 is on, the third switching transistor Q3_E1 is on, and the first switching transistor Q1_E1 and the fourth switching transistor Q4_E1 are cut-off. When the third switching transistor Q3_E1 of the first bridge arm E1 is on, the fourth switching transistor Q4_E1 is on, and the first switching transistor Q1_E1 and the second switching transistor Q2_E1 are cut-off.

Likewise, according to a logical relationship of an on-off state of a switching transistor, switching transistors of the second bridge arm E2 and the third bridge arm E3 in the bridge arm group in the first multilevel bridge arm group and switching transistors of the first bridge arm F1, the second bridge arm F2, and the third bridge arm F3 in the bridge arm group in the second multilevel bridge arm group are connected or disconnected, that is, the switching transistors have a same connection or disconnection state as the first switching transistor Q1_E1, the second switching transistor Q2_E1, the third switching transistor Q3_E1, and the fourth switching transistor Q4_E1 of the first bridge arm E1 in the bridge arm group in the first multilevel bridge arm group.

It should be noted that for the bridge arm group in the first multilevel bridge arm group, within a high frequency period, a phase of a high frequency drive signal of the first bridge arm E1 deviates from a phase of a high frequency drive signal of the second bridge arm E2 by 360/3 degrees, and a phase of a high frequency drive signal of the second bridge arm E2 deviates from a phase of a high frequency drive signal of the third bridge arm E3 by 360/3 degrees, that is, phases of on-off states of switching transistors of two adjacent bridge arms among the first bridge arm E1, the second bridge arm E2, and the third bridge arm E3 deviate from each other by 360/3 degrees. Likewise, for the bridge arm group in the second multilevel bridge arm group, within a high frequency period, a phase of a high frequency drive signal of the first bridge arm F1 deviates from a phase of a high frequency drive signal of the second bridge arm F2 by 360/3 degrees, and a phase of a high frequency drive signal of the second bridge arm F2 deviates from a phase of a high frequency drive signal of the third bridge arm F3 by 360/3 degrees, that is, phases of on-off states of switching transistors of two adjacent bridge arms among the first bridge arm F1, the second bridge arm F2, and the third bridge arm F3 also deviate from each other by 360/3 degrees. The phase of the high frequency drive signal of the first bridge arm E1 deviates from the phase of the high frequency drive signal of the first bridge arm F1 by 360/6 degrees, the phase of the high frequency drive signal of the second bridge arm E2 deviates from the phase of the high frequency drive signal of the second bridge arm F2 by 360/6 degrees, and the phase of the high frequency drive signal of the third bridge arm E3 deviates from the phase of the high frequency drive signal of the third bridge arm F3 by 360/6 degrees. Within a working frequency period, phases of high frequency drive signals of the first multilevel bridge arm group 101 and the second multilevel bridge arm group 102 deviate from each other by 180 degrees, so that phases of level signals output by the first multilevel bridge arm group 101 and the second multilevel bridge arm group 102 deviate from each other by 180 degrees, and then the converting unit 10 is enabled to output 13 level signals. The high frequency period is a period of a high frequency drive signal, and the working frequency period is an alternating current working frequency period of alternating currents output by the first multilevel bridge arm group and the second multilevel bridge arm group. According to different states of a duty cycle, the bridge arm groups may output different level signals, where the duty cycle is a ratio of duration of a positive pulse to a whole pulse period in a periodic pulse sequence.

Figure 3:
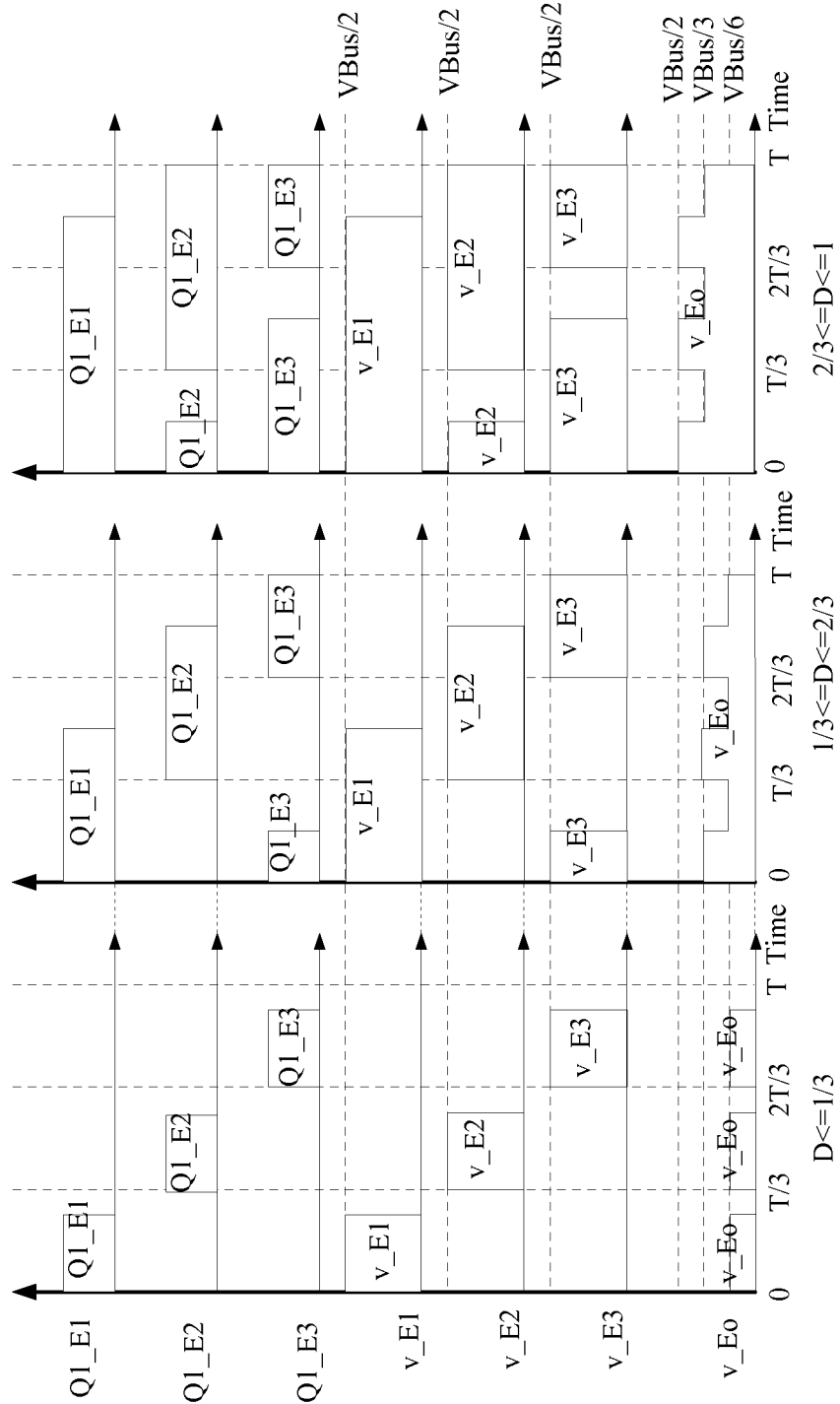
FIG. 3 is a schematic diagram of an output voltage of a multilevel converter according to an embodiment of the present invention.

For example, a positive half period is used as an example, as shown in FIG. 3, when a duty cycle D≤⅓, assuming that when the first switching transistor Q1_E1 of the first bridge arm E1 is on, the second switching transistor Q2_E1 is on, and the third switching transistor Q3_E1 and the fourth switching transistor Q4_E1 are cut-off, and then a connection wire V_E1 between the first bridge arm E1 and the coupled inductor may output VBus/2; when the first switching transistor Q1_E2 of the second bridge arm E2 is disconnected, the second switching transistor Q2_E2 and the third switching transistor Q3_E2 are connected, and the fourth switching transistor Q4_E2 is cut-off, and then a connection wire V_E2 between the second bridge arm E2 and the coupled inductor may output Bus_N; when the first switching transistor Q1_E3 of the third bridge arm E3 is disconnected, the second switching transistor Q2_E3 and the third switching transistor Q3_E3 are connected, and the fourth switching transistor Q4_E3 is in a disconnection state, and then a connection wire V_E3 between the third bridge arm E3 and the coupled inductor outputs Bus_N; and then, the first multilevel bridge arm group outputs a ((VBus/2)+(Bus_N)+(Bus_N))/3=VBus/6 level signal, that is, V_Eo is VBus/6.

Likewise, as phases of on-off states of switching transistors of two adjacent bridge arms deviate from each other by 360/3 degrees, when the first switching transistor Q1_E2 of the second bridge arm E2 is on, the second switching transistor Q2_E2 is on, and the third switching transistor Q3_E2 and the fourth switching transistor Q4_E2 are cut-off, and then the connection wire V_E2 between the second bridge arm E2 and the coupled inductor may output VBus/2; when the first switching transistor Q1_E1 of the first bridge arm E1 is disconnected, the second switching transistor Q2_E1 and the third switching transistor Q3_E1 are connected, and the fourth switching transistor Q4_E1 is cut-off, and then the connection wire V_E1 between the first bridge arm E1 and the coupled inductor may output Bus_N; when the first switching transistor Q1_E3 of the third bridge arm E3 is disconnected, the second switching transistor Q2_E3 and the third switching transistor Q3_E3 are connected, and the fourth switching transistor Q4_E3 is cut-off, and then the connection wire V_E3 between the third bridge arm E3 and the coupled inductor outputs Bus_N; and then, the first multilevel bridge arm group outputs a ((Bus_N)+(VBus/2)+(Bus_N))/3=VBus/6 level signal, that is, V_Eo is VBus/6.

Likewise, when the first switching transistor Q1_E3 of the third bridge arm E3 is on, the second switching transistor Q2_E3 is on, and the third switching transistor Q3_E3 and the fourth switching transistor Q4_E3 are cut-off, and then the connection wire V_E3 between the third bridge arm E3 and the coupled inductor outputs VBus_2; when the first switching transistor Q1_E1 of the first bridge arm E1 is disconnected, the second switching transistor Q2_E1 and the third switching transistor Q3_E1 are connected, and the fourth switching transistor Q4_E1 is cut-off, and then the connection wire V_E1 between the first bridge arm E1 and the coupled inductor may output Bus_N; when the first switching transistor Q1_E2 of the second bridge arm E2 is disconnected, the second switching transistor Q2_E2 and the third switching transistor Q3_E2 are connected, and the fourth switching transistor Q4_E2 is cut-off, and then the connection wire V_E2 between the second bridge arm E2 and the coupled inductor may output Bus_N; and then, the first multilevel bridge arm group outputs a ((Bus_N)+(Bus_N)+(VBus/2))/3=VBus/6 level signal, that is, V_Eo is VBus/6.

When ⅓≤the duty cycle D≤⅔, assuming that when the first switching transistor Q1_E1 of the first bridge arm E1 is on, the second switching transistor Q2_E1 is on, and the third switching transistor Q3_E1 and the fourth switching transistor Q4_E1 are cut-off, and then the connection wire V_E1 between the first bridge arm E1 and the coupled inductor may output VBus/2; when the first switching transistor Q1_E2 of the second bridge arm E2 is on, the second switching transistor Q2_E2 is on, and the third switching transistor Q3_E2 and the fourth switching transistor Q4_E2 are cut-off, and then the connection wire V_E2 between the second bridge arm E2 and the coupled inductor may output VBus/2; when the first switching transistor Q1_E3 of the third bridge arm E3 is disconnected, the second switching transistor Q2_E3 and the third switching transistor Q3_E3 are connected, and the fourth switching transistor Q4_E3 is cut-off, and then the connection wire V_E3 between the third bridge arm E3 and the coupled inductor outputs Bus_N; and then, the first multilevel bridge arm group outputs a ((VBus/2)+(VBus/2)±(Bus_N))/3=VBus/3 level signal, that is, V_Eo is VBus/3.

Likewise, because phases of on-off states of switching transistors of two adjacent bridge arms deviate from each other by 360/3 degrees, when the first switching transistor Q1_E2 of the second bridge arm E2 and the first switching transistor Q1_E3 of the third bridge arm E3 are connected at the same time, that is, the first switching transistor Q1_E2 of the second bridge arm E2 is on, the second switching transistor Q2_E2 is on, and the third switching transistor Q3_E2 and the fourth switching transistor Q4_E2 are cut-off, the connection wire V_E2 between the second bridge arm E2 and the coupled inductor may output VBus/2; when the first switching transistor Q1_E3 of the third bridge arm E3 is on, the second switching transistor Q2_E3 is on, and the third switching transistor Q3_E3 and the fourth switching transistor Q4_E3 are cut-off, and then the connection wire V_E3 between the third bridge arm E3 and the coupled inductor outputs VBus/2; when the first switching transistor Q1_E1 of the first bridge arm E1 is disconnected, the second switching transistor Q2_E1 and the third switching transistor Q3_E1 are connected, and the fourth switching transistor Q4_E1 is in a disconnection state, and then the connection wire V_E1 between the first bridge arm E1 and the coupled inductor may output Bus_N; and then, the first multilevel bridge arm group outputs a ((Bus_N)+(VBus/2)+(VBus/2))/3=VBus/3 level signal, that is, V_Eo is VBus/3.

Likewise, when the first switching transistor Q1_E3 of the third bridge arm E3 and the first switching transistor Q1_E1 of the first bridge arm E1 are connected at the same time, that is, the first switching transistor Q1_E1 of the first bridge arm E1 is on, the second switching transistor Q2_E1 is on, and the third switching transistor Q3_E1 and the fourth switching transistor Q4_E1 are cut-off, the connection wire V_E1 between the first bridge arm E1 and the coupled inductor may output VBus/2; when the first switching transistor Q1_E3 of the third bridge arm E3 is on, the second switching transistor Q2_E3 is on, and the third switching transistor Q3_E3 and the fourth switching transistor Q4_E3 are cut-off, and then the connection wire V_E3 between the third bridge arm E3 and the coupled inductor outputs VBus/2; when the first switching transistor Q1_E2 of the second bridge arm E2 is disconnected, the second switching transistor Q2_E2 and the third switching transistor Q3_E2 are connected, and the fourth switching transistor Q4_E2 is cut-off, and then the connection wire V_E2 between the second bridge arm E2 and the coupled inductor may output Bus_N; and then, the first multilevel bridge arm group outputs a ((VBus/2)+(Bus_N)+(VBus/2))/3=VBus/3 level signal, that is, V_Eo is VBus/3.

When ⅔≤the duty cycle D≤1, assuming that when the first switching transistor Q1_E1 of the first bridge arm E1 is on, the second switching transistor Q2_E1 is on, and the third switching transistor Q3_E1 and the fourth switching transistor Q4_E1 are cut-off, and then the connection wire V_E1 between the first bridge arm E1 and the coupled inductor may output VBus/2; when the first switching transistor Q1_E2 of the second bridge arm E2 is on, the second switching transistor Q2_E2 is on, and the third switching transistor Q3_E2 and the fourth switching transistor Q4_E2 are cut-off, and then the connection wire V_E2 between the second bridge arm E2 and the coupled inductor may output VBus/2; when the first switching transistor Q1_E3 of the third bridge arm E3 is on, the second switching transistor Q2_E3 is on, and the third switching transistor Q3_E3 and the fourth switching transistor Q4_E3 are cut-off, and then the connection wire V_E3 between the third bridge arm E3 and the coupled inductor outputs VBus/2; and then, the first multilevel bridge arm group outputs a ((VBus/2)+(VBus/2)±(VBus/2))/3=VBus/2 level signal, that is, V_Eo is VBus/2.

Within a positive half period, when a VBus/2 level signal is input to the first multilevel bridge arm group, the first multilevel bridge arm group may output three level signals VBus/6, VBus/3, and VBus/2; likewise, within a negative half period, when a −VBus/2 level signal is input to the first multilevel bridge arm group, the first multilevel bridge arm group may output three level signals −VBus/6, −VBus/3, and =−VBus/2; and when V_E1, V_E2, and V_E3 output Bus_N at the same time, the first multilevel bridge arm group may output 0V. Therefore, in the working frequency period, the first multilevel bridge arm group may output seven level signals VBus/6, VBus/3, VBus/2, −VBus/6, |VBus/3, |VBus/2, and 0V.

A structure of the second multilevel bridge arm group is the same as a structure of the first multilevel bridge arm group and devices at a same position have a same function. Likewise, the second multilevel bridge arm group may also output seven level signals VBus/6, VBus/3, VBus/2, −VBus/6, −VBus/3, −VBus/2, and 0V.

Figure 4:
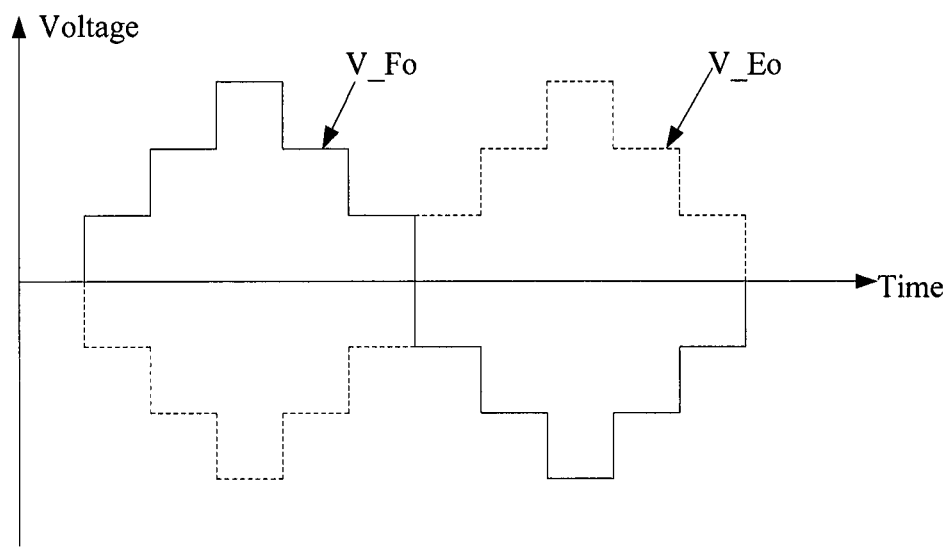
FIG. 4 is a waveform diagram of a voltage in a multilevel converter according to an embodiment of the present invention.

In this way, as shown in FIG. 4, voltages of three levels VBus/2, −VBus/2, and −VBus/2 input by the direct current inputting unit is transformed into a step-type waveform represented by a solid line and a step-type waveform represented by a dashed line that are shown in FIG. 4, that is, an output waveform V_Eo of the first multilevel bridge arm group and an output waveform V_Fo of the second multilevel bridge arm group; and a phase of the output waveform V_Eo of the first multilevel bridge arm group deviates from a phase of the output waveform V_Fo of the second multilevel bridge arm group by 180 degrees. In FIG. 4, the horizontal axis represents time t and the vertical axis represents voltage v.

Figure 5A:
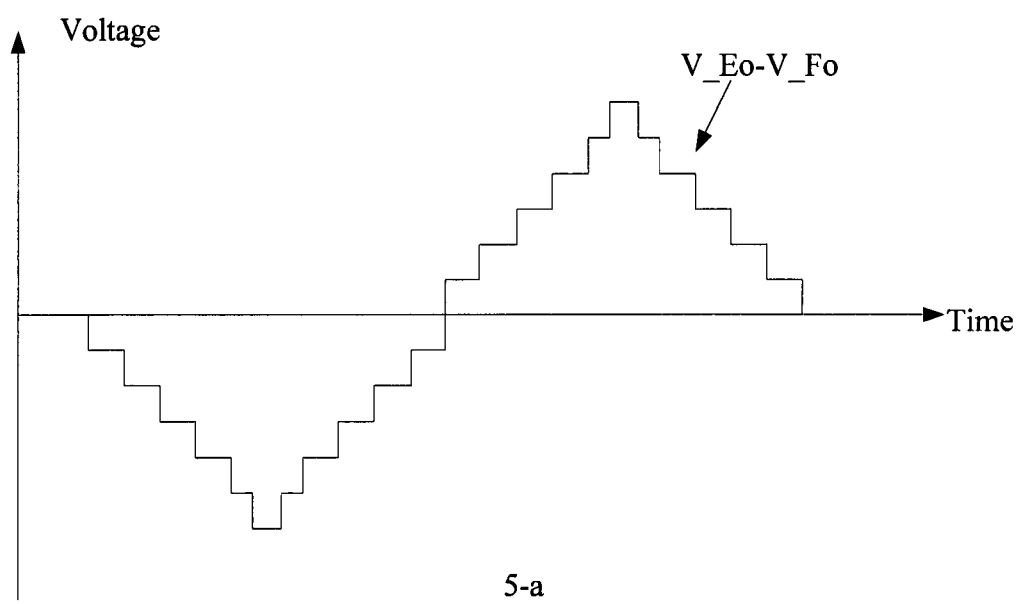
FIG. 5A is a waveform diagram of a voltage in another multilevel converter according to an embodiment of the present invention.
Figure 5B:
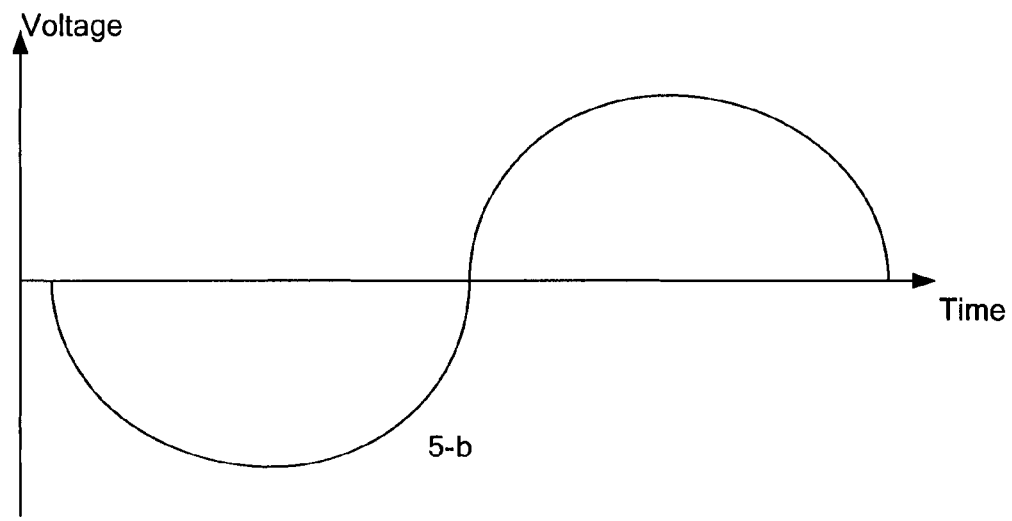
FIG. 5B is a waveform diagram of a voltage in still another multilevel converter according to an embodiment of the present invention.

Further, as shown in FIG. 5A, the filtering unit performs voltage transformation to transform 2[(3−1)×3]+1=13 level signals output by the first multilevel bridge arm group and the second multilevel bridge arm group into an alternating current; then, filters the alternating current by using the isolation transformer and the capacitor; and finally, obtains a sine wave shown in FIG. 5B and loads the sine wave voltage on the load R. In FIGS. 5A and 5B, the horizontal axis represents time t and the vertical axis represents voltage v.

In a practical application, when three converting units and three filtering units are disposed in the multilevel converter, the multilevel converter may be applied to a three-phase system, that is, the multilevel converter may be connected to a direct current power supply and converts an input direct current into an alternating current, so as to supply the alternating current to a load.

Figure 6:
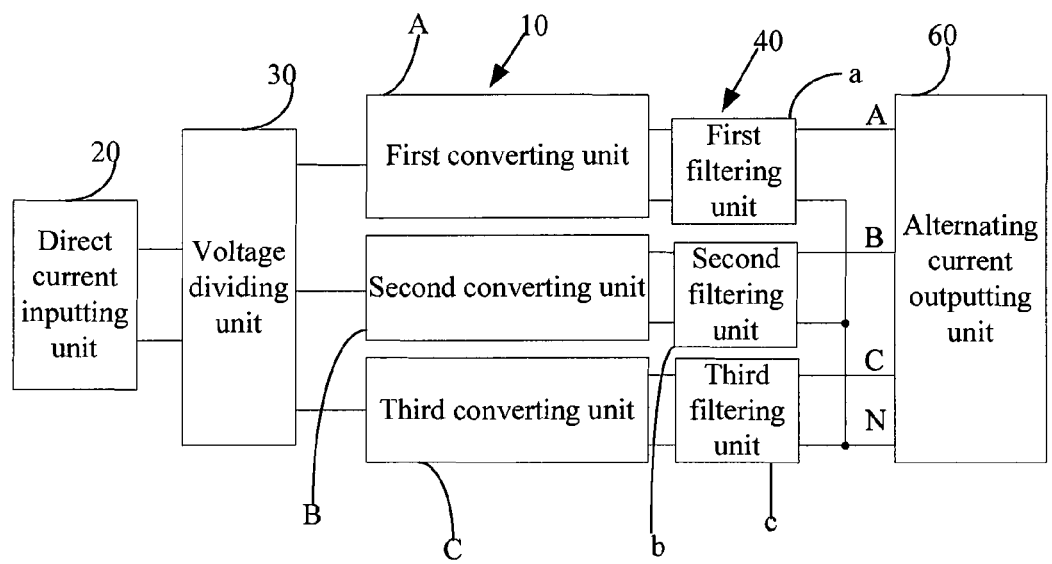
FIG. 6 is a schematic structural diagram of yet another multilevel converter according to an embodiment of the present invention.

For example, assuming that three converting units and three filtering units are disposed in the multilevel converter in the embodiment of the present invention, and as shown in FIG. 6, the multilevel converter includes a direct current inputting unit 20, a voltage dividing unit 30, three converting units 10, three filtering units 40, and an alternating current outputting unit 60, where the alternating current outputting unit 60 is configured to output an alternating current. The three converting units include a first converting unit A, a second converting unit B, and a third converting unit C; and the three filtering units include a first filtering unit a, a second filtering unit b, and a third filtering unit c.

An input end of the voltage dividing unit 30 is connected to an output end of the direct current inputting unit 20; an input end of the first converting unit A, an input end of the second converting unit B, and an input end of the third converting unit C are separately connected to the output ends of the voltage dividing unit 30; an output end of the first converting unit A is connected to an input end of the first filtering unit a, an output end of the second converting unit B is connected to an input end of the second filtering unit b, and an output end of the third converting unit C is connected to an input end of the third filtering unit c.

It should be noted that output ends of the three filtering units of the multilevel converter may include a neutral wire, that is, a phase wire A of the first filtering unit a outputs an alternating current of the first converting unit A, a phase wire B of the second filtering unit b outputs an alternating current of the second converting unit B, a phase wire C of the third filtering unit c outputs an alternating current of the third converting unit C, and the other phase wire of the first filtering unit a, the other phase wire of the second filtering unit b, and the other phase wire of the third filtering unit c are connected at a point to form a neutral wire N. A voltage between any two of the phase wire A, the phase wire B, and the phase wire C is 380V, and a voltage between the neutral wire N and each of the phase wire A, the phase wire B, and the phase wire C is 220V. The neutral wire is used to make various phase voltages that are output by the multilevel converter approximately symmetric, and has a protective function to a load to which the multilevel converter is on, that is, when an open circuit or short circuit occurs in any phase of the phase wire A, the phase wire B, and the phase wire C, and an output voltage abruptly increases or decreases, the neutral wire balances voltages of the other two phases, so as to avoid damaging the load.

If the output ends of the three filtering units of the multilevel converter do not include a neutral wire, a Y-shaped or Δ-shaped connection manner may be used for the output ends of the filtering units.

Figure 7:
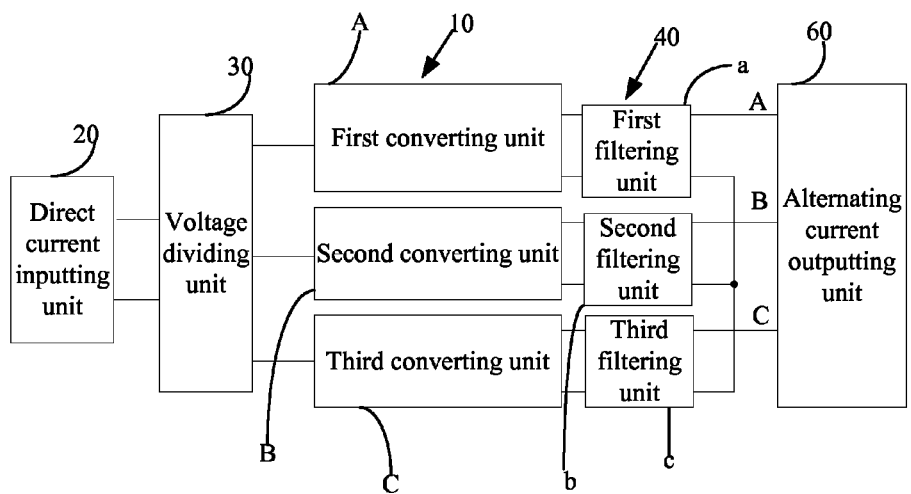
FIG. 7 is a schematic structural diagram of yet another multilevel converter according to an embodiment of the present invention.

As shown in FIG. 7, a Y-shaped connection manner used for the output ends of the filtering units is that the phase wire A of the first filtering unit a outputs an alternating current of the first converting unit A, the phase wire B of the second filtering unit b outputs an alternating current of the second converting unit B, the phase wire C of the third filtering unit c outputs an alternating current of the third converting unit C, and the other phase wire of the first filtering unit a, the other phase wire of the second filtering unit b, and the other phase wire of the third filtering unit c are connected at a point.

Figure 8:
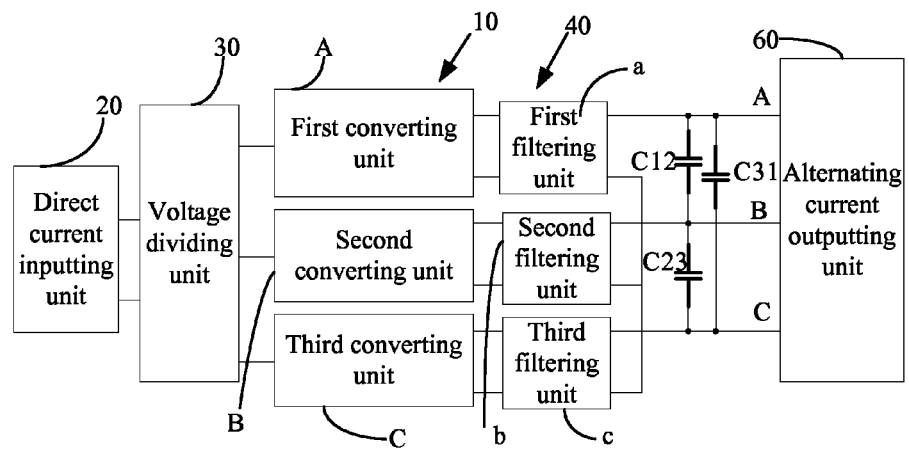
FIG. 8 is a schematic structural diagram of yet another multilevel converter according to an embodiment of the present invention.

As shown in FIG. 8, a Δ-shaped connection manner that may be used for the output ends of the filtering units is that the phase wire A is connected to the phase wire B by using a capacitor C12, the phase wire B is connected to the phase wire C by using a capacitor C23, and the phase wire C is connected to the phase wire A by using a capacitor C31, that is, any two of the phase wire A, the phase wire B, and the phase wire C are connected to form a Δ shape, and the other phase wire of the first filtering unit a, the other phase wire of the second filtering unit b, and the other phase wire of the third filtering unit c separately hang in the air.

Especially, for example, in a three-phase system of China Grid, phases of alternating currents output by all converting units deviate from each other by 120 degrees, so as to supply the alternating currents to a load. The multilevel converter in this embodiment of the present invention may also be applied to another multi-phase system, and a working principle is the same as that of the multilevel converter in this embodiment of the present invention, which is not described herein again.

Figure 9A:
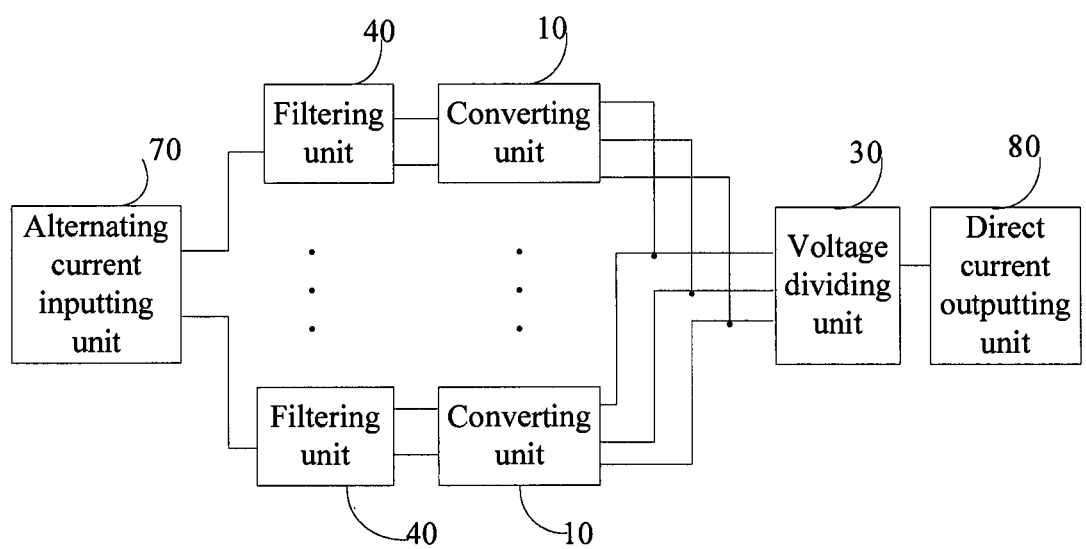
FIG. 9A is a schematic structural diagram of yet another multilevel converter according to an embodiment of the present invention.

An embodiment of the present invention provides a multilevel converter. As shown in FIG. 9A, the multilevel converter includes at least one converting unit 10, where the converting unit includes two multilevel bridge arm groups connected in parallel, and the two multilevel bridge arm groups include a first multilevel bridge arm group and a second multilevel bridge arm group, where each multilevel bridge arm group includes a bridge arm group and a coupled inductor, the bridge arm group is connected to the coupled inductor, and the coupled inductor is configured to perform filtering on a level signal input to the bridge arm group, where the bridge arm group includes at least N interleaved parallel bridge arms, and each bridge arm is connected to the coupled inductor, where N is an integer greater than or equal to 3; within a high frequency period, a phase of a high frequency drive signal of each bridge arm in the bridge arm group deviates, by 360/N degrees, from a phase of a high frequency drive signal of a bridge arm adjacent to each bridge arm, and a phase of a high frequency drive signal of each bridge arm in the first multilevel bridge arm group deviates, by 360/2N degrees, from a phase of a high frequency drive signal of a bridge arm that is in the second multilevel bridge arm group and corresponding to each bridge arm in the first multilevel arm group; and within a working frequency period, phases of high frequency drive signals of the two multilevel bridge arm groups that are connected in parallel deviate from each other by 180 degrees, so that phases of level signals input to the two multilevel bridge arm groups that are connected in parallel deviate from each other by 180 degrees, and then transformation is performed on 2[(M−1)×N]+1 level signals received by the converting unit and a direct current with at least three levels is output, where M is the number of levels output by the converting unit and M is an integer greater than or equal to 3; an alternating current inputting unit 70 configured to input an alternating current and supply the alternating current to the converting unit 10; at least one filtering unit 40 configured to perform voltage transformation to transform the alternating current input by the alternating current inputting unit 70 into a level signal, and perform filtering on the alternating current and output the level signal to the converting unit 10, where an input end of each filtering unit 40 is connected to an output end of the alternating current inputting unit 70, an output end of each filtering unit 40 is connected to an input end of a different converting unit 10, and the filtering unit is connected to the converting unit 10 in series; a voltage dividing unit 30 configured to transform the direct current with at least three levels that is output by the converting unit 10 into a direct current with two levels, where an input end of the voltage dividing unit 30 is connected to an output end of each converting unit, and the input end of the voltage dividing unit is connected to an output end of each bridge arm in each converting unit; and a direct current outputting unit 80 configured to receive the direct current output by the voltage dividing unit 30 and output the direct current, where an output end of the voltage dividing unit 30 is connected to an input end of the direct current inputting unit 80.

Figure 9B:
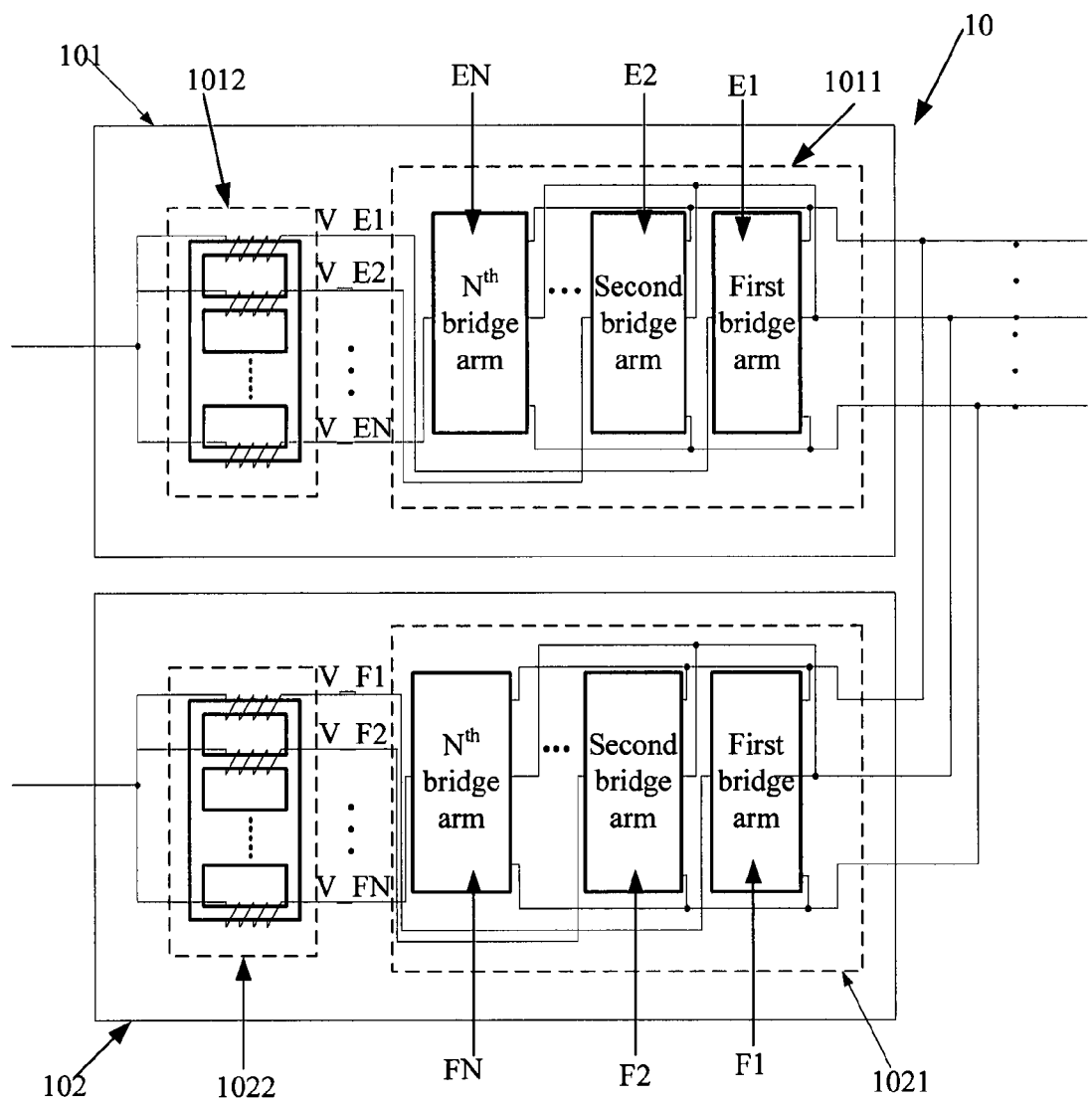
FIG. 9B is a schematic structural diagram of yet another multilevel converter according to an embodiment of the present invention.

As shown in FIG. 9B, the converting unit 10 includes two multilevel bridge arm groups connected in parallel, where the two multilevel bridge arm groups include a first multilevel bridge arm group 101 and a second multilevel bridge arm group 102. The two multilevel bridge arm groups connected in parallel have a same structure and devices at a same position have a same function.

The first multilevel bridge arm group 101 includes a bridge arm group 1011 and a coupled inductor 1012, the bridge arm group 1011 is connected to the coupled inductor 1012, and the coupled inductor 1012 is configured to filter a level signal output by the bridge arm group 1011. The bridge arm group 1011 includes at least N interleaved parallel bridge arms, and the N interleaved parallel bridge arms include a first bridge arm E1, a second bridge arm E2, and an N$^{th}$ bridge arm EN, where N is an integer greater than or equal to 3. The first bridge arm E1 is connected to the coupled inductor 1012 by using V_E1, the second bridge arm E2 is connected to the coupled inductor 1012 by using V_E2, and the N$^{th}$ bridge arm EN is connected to the coupled inductor 1012 by using V_EN.

Likewise, the second multilevel bridge arm group 102 includes a bridge arm group 1021 and a coupled inductor 1022, the bridge arm group 1021 is connected to the coupled inductor 1022, and the coupled inductor 1022 is configured to filter a level signal output by the bridge arm group 1021. The bridge arm group 1021 includes at least N interleaved parallel bridge arms, and the N interleaved parallel bridge arms include a first bridge arm F1, a second bridge arm F2, and an N$^{th}$ bridge arm FN, where N is an integer greater than or equal to 3. The first bridge arm F1 is connected to the coupled inductor 1022 by using V_F1, the second bridge arm F2 is connected to the coupled inductor 1022 by using V_F2, and the N$^{th}$ bridge arm FN is connected to the coupled inductor 1022 by using V_FN.

It should be noted that, within a high frequency period, a phase of a high frequency drive signal of each bridge arm in the bridge arm group 1011 deviates, by 360/N degrees, from a phase of a high frequency drive signal of a bridge arm adjacent to each bridge arm, a phase of a high frequency drive signal of each bridge arm in the bridge arm group 1021 deviates, by 360/N degrees, from a phase of a high frequency drive signal of a bridge arm adjacent to each bridge arm, and a phase of a high frequency drive signal of each bridge arm in the first multilevel bridge arm group 101 deviates, by 360/2N degrees, from a phase of a high frequency drive signal of a bridge arm that is in the second multilevel bridge arm group 102 and corresponding to each bridge arm in the first multilevel arm group 101; and within a working frequency period, a phase of a high frequency drive signal of the first multilevel bridge arm group 101 deviates from a phase of a high frequency drive signal of the second multilevel bridge arm group 102 by 180 degrees, so that phases of level signals input to the first multilevel bridge arm group 101 and the second multilevel bridge arm group 102 deviate from each other by 180 degrees, and then transformation is performed on 2[(M−1)×N]+1 level signals received by the converting unit and a direct current with at least three levels is output, where M is the number of levels output by the converting unit and M is an integer greater than or equal to 3.

In this way, transformation is performed on 2[(M−1)×N]+1 level signals received by two multilevel bridge arm groups connected in parallel and then a direct current with at least three levels is output by using the two multilevel bridge arm groups connected in parallel, where each multilevel bridge arm group includes a bridge arm group and a coupled inductor, and the bridge arm group is connected to the coupled inductor. Compared with the prior art, in a case in which the number of input level signals is the same, by using a multilevel bridge arm group to transform the direct current with at least three levels into a direct current with two levels, the present invention can effectively reduce processing difficulty of a coupled inductor and simplify a circuit structure.

It should be noted that each bridge arm includes at least one switching transistor, where the switching transistor is a power device, and the power device may be at least one of a MOSFET, an IGBT, and an IGCT, or a combination of different power devices. A switching transistor of each bridge arm is connected or disconnected according to a logical relationship of an on-off state of a switching transistor shown in table 2, so as to enable the bridge arm groups to output different level signals.

TABLE 2

| Logical relationship of an on-off state of a switching transistor | | | |
|---|---|---|---|
| Q1 | Q2 | Q3 | Q4 |
| ON | ON | OFF | OFF |
| OFF | ON | ON | OFF |
| OFF | OFF | ON | ON |

The voltage dividing unit 30 includes multiple voltage dividing capacitors. The voltage dividing capacitors may be connected in series and are configured to transform the direct current with at least three levels that is output by the converting unit 10 into the direct current with two levels.

The filtering unit 40 may include an isolation transformer and a capacitor, where the isolation transformer is configured to perform voltage transformation to transform the alternating current input by the alternating current inputting unit 70 into a level signal; and perform filtering on the level signal by using leakage inductance of the isolation transformer, perform filtering on the alternating current by using the capacitor, and output the level signal.

The filtering unit 40 may also include the isolation transformer and a passive power filter, where the isolation transformer is configured to perform voltage transformation to transform the alternating current input by the alternating current inputting unit 70 into a level signal; and perform filtering on the level signal by using leakage inductance of the isolation transformer, perform filtering on the alternating current by using the passive power filter, and output the level signal. The passive power filter may be an LC filter.

In this way, filtering is performed, by using leakage inductance of a coupled inductor and leakage inductance of an isolation transformer, on an alternating current input by an alternating current inputting unit, which increases power density of a multilevel converter and effectively reduces a cost of performing filtering on an alternating current input by an alternating current inputting unit. In addition, compared with the prior art, in a case in which a same number of levels are input to bridge arm groups of the converting unit, a bridge arm group and a coupled inductor in two multilevel bridge arm groups connected in parallel are relatively simple to be processed and suitable for mass production.

In a practical application, when one converting unit and one filtering unit are disposed in the multilevel converter, the multilevel converter may be applied to a single-phase rectifier system, that is, the multilevel converter may be connected to an alternating current power supply and converts an input alternating current into a direct current, so as to supply the direct current to a load.

Figure 10:
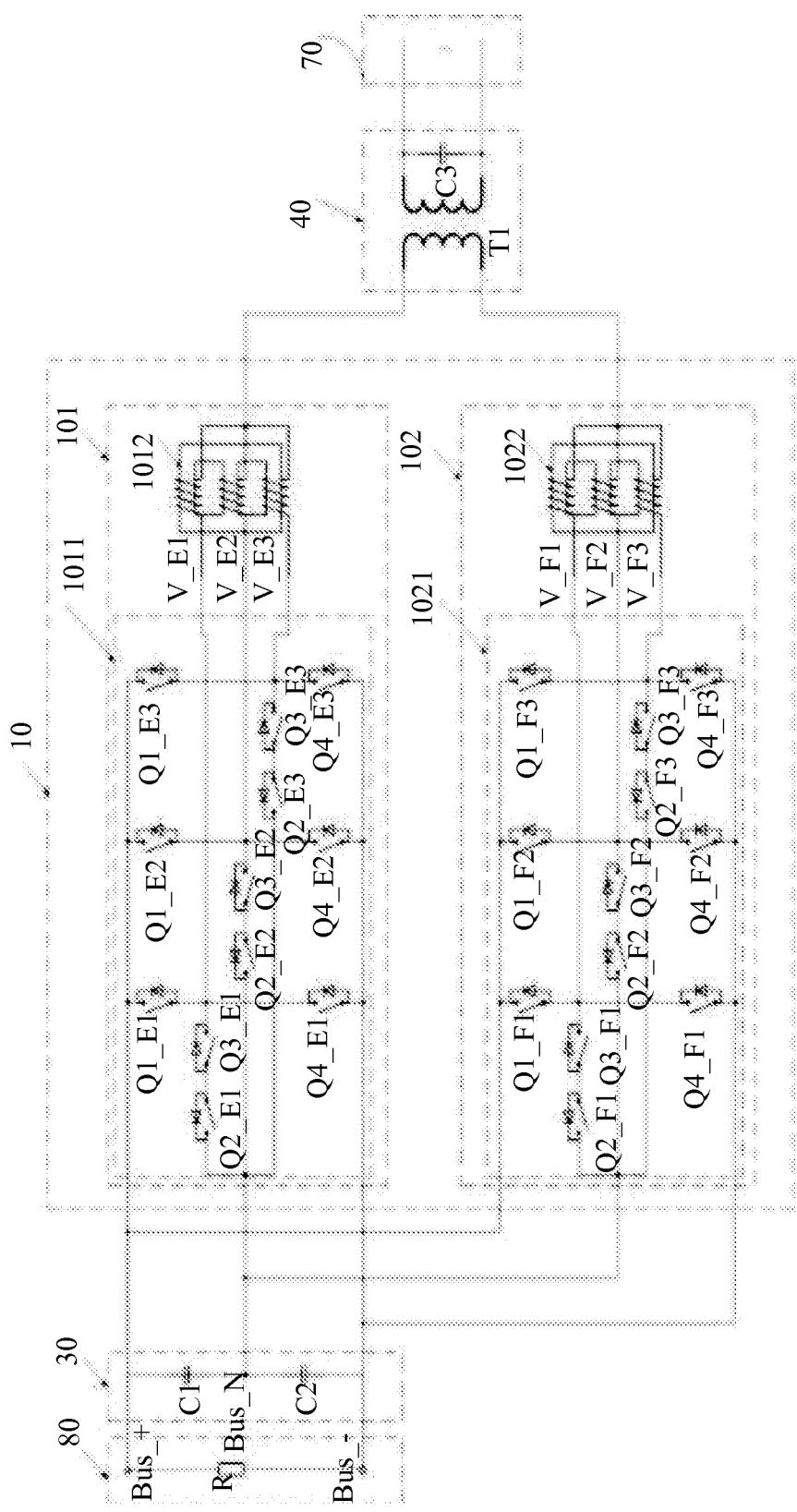
FIG. 10 is a schematic structural diagram of yet another multilevel converter according to an embodiment of the present invention.

For example, assuming that one converting unit and one filtering unit are disposed in the multilevel converter in the embodiment of the present invention, M is 3, N is 3, and as shown in FIG. 10, the multilevel converter includes an alternating current inputting unit 70 configured to input an alternating current and supply the alternating current to a converting unit 10; a filtering unit 40 configured to perform voltage transformation to transform the alternating current input by the alternating current inputting unit 70 into a level signal; and perform filtering on the alternating current and output the level signal to the converting unit, where an input end of each filtering unit 40 is connected to an output end of the alternating current inputting unit 70, an output end of each filtering unit 40 is connected to an input end of a different converting unit 10, the filtering unit 40 is connected to the converting unit 10 in series, and the filtering unit 40 may include an isolation transformer T1 and a capacitor C3; and it should be noted that the filtering unit 40 includes an isolation transformer and an LC filter, and the isolation transformer performs voltage transformation to transform the alternating current input by the alternating current inputting unit 70 into a level signal, and performs filtering on the alternating current by using the capacitor C3 or the LC filter and performs filtering on the level signal by using leakage inductance of the isolation transformer, which increases power density of a multilevel converter and effectively reduces a cost of performing filtering on an alternating current input by an alternating current inputting unit; the converting unit 10, where the converting unit 10 includes a first multilevel bridge arm group 101 and a second multilevel bridge arm group 102, where the first multilevel bridge arm group 101 and the second multilevel bridge arm group 102 are connected in parallel, two multilevel bridge arm groups connected in parallel have a same structure and devices at a same position have a same function, and an input end of the converting unit 10 is connected to an output end of the voltage transforming unit 40, where the first multilevel bridge arm group 101 includes a bridge arm group 1011 and a coupled inductor 1012, and the bridge arm group 1011 includes a first bridge arm E1, a second bridge arm E2, and a third bridge arm E3, where the first bridge arm E1 includes a first switching transistor Q1_E1, a second switching transistor Q2_E1, a third switching transistor Q3_E1, and a fourth switching transistor Q4_E1; the second bridge arm E2 includes a first switching transistor Q1_E2, a second switching transistor Q2_E2, a third switching transistor Q3_E2, and a fourth switching transistor Q4_E2; the third bridge arm E3 includes a first switching transistor Q1_E3, a second switching transistor Q2_E3, a third switching transistor Q3_E3, and a fourth switching transistor Q4_E3; the first bridge arm E1, the second bridge arm E2, and the third bridge arm E3 are connected in an interleaved parallel manner; and the first bridge arm E1 is connected to the coupled inductor 1012 by using V_E1, the second bridge arm E2 is connected to the coupled inductor 1012 by using V_E2, the third bridge arm E3 is connected to the coupled inductor 1012 by using V_E3, and filtering is performed, by using leakage inductance of the coupled inductor 1012, on a level signal output by the bridge arm group 1011; the second multilevel bridge arm group 102 includes a bridge arm group 1021 and a coupled inductor 1022, and the bridge arm group 1021 includes a first bridge arm F1, a second bridge arm F2, and a third bridge arm F3, where the first bridge arm F1 includes a first switching transistor Q1_F1, a second switching transistor Q2_F1, a third switching transistor Q3_F1, and a fourth switching transistor Q4_F1; the second bridge arm F2 includes a first switching transistor Q1_F2, a second switching transistor Q2_F2, a third switching transistor Q3_F2, and a fourth switching transistor Q4_F2; the third bridge arm F3 includes a first switching transistor Q1_F3, a second switching transistor Q2_F3, a third switching transistor Q3_F3, and a fourth switching transistor Q4_F3; the first bridge arm F1, the second bridge arm F2, and the third bridge arm F3 are connected in the interleaved parallel manner; and the first bridge arm F1 is connected to the coupled inductor 1022 by using V_F1, the second bridge arm F2 is connected to the coupled inductor 1022 by using V_F2, the third bridge arm F3 is connected to the coupled inductor 1022 by using V_F3, and filtering is performed, by using leakage inductance of the coupled inductor 1022, on a level signal output by the bridge arm group 1021; and a voltage dividing unit 30, where the voltage dividing unit 30 includes a first voltage dividing capacitor C1 and a second voltage dividing capacitor C2, where the first voltage dividing capacitor C1 and the second voltage dividing capacitor C2 transform a direct current with at least three levels that is output by the converting unit 10 into a direct current with two levels; and an input end of the voltage dividing unit 30 is connected to an output end of the converting unit 10; and a direct current outputting unit 80 configured to receive the direct current output by the voltage dividing unit 30 and output the direct current, where an output end of the voltage dividing unit 30 is connected to an input end of the direct current inputting unit 80.

It should be noted that the direct current inputting unit 80 is further connected to a load R, and an output voltage of the direct current inputting unit 80 supplies electrical energy to the load R.

Assuming that the alternating current inputting unit inputs a 220V alternating current, and then, the filtering unit performs voltage transformation on the input 220V alternating current and performs filtering on the alternating current.

According to a logical relationship of an on-off state of a switching transistor, in the first multilevel bridge arm group, when the first switching transistor Q1_E1 of the first bridge arm E1 in the bridge arm group is on, the second switching transistor Q2_E1 is on, and the third switching transistor Q3_E1 and the fourth switching transistor Q4_E1 are in a disconnection state. When the second switching transistor Q2_E1 of the first bridge arm E1 is on, the third switching transistor Q3_E1 is on, and the first switching transistor Q1_E1 and the fourth switching transistor Q4_E1 are cut-off. When the third switching transistor Q3_E1 of the first bridge arm E1 is on, the fourth switching transistor Q4_E1 is on, and the first switching transistor Q1_E1 and the second switching transistor Q2_E1 are cut-off.

Likewise, according to a logical relationship of an on-off state of a switching transistor, switching transistors of the second bridge arm E2 and the third bridge arm E3 in the bridge arm group in the first multilevel bridge arm group and switching transistors of the first bridge arm F1, the second bridge arm F2, and the third bridge arm F3 in the bridge arm group in the second multilevel bridge arm group are connected or disconnected, that is, the switching transistors have a same connection or disconnection state as the first switching transistor Q1_E1, the second switching transistor Q2_E1, the third switching transistor Q3_E1, and the fourth switching transistor Q4_E1 of the first bridge arm E1 in the bridge arm group in the first multilevel bridge arm group.

It should be noted that for the bridge arm group in the first multilevel bridge arm group, within a high frequency period, a phase of a high frequency drive signal of the first bridge arm E1 deviates from a phase of a high frequency drive signal of the second bridge arm E2 by 360/3 degrees, and a phase of a high frequency drive signal of the second bridge arm E2 deviates from a phase of a high frequency drive signal of the third bridge arm E3 by 360/3 degrees, that is, phases of on-off states of switching transistors of two adjacent bridge arms among the first bridge arm E1, the second bridge arm E2, and the third bridge arm E3 deviate from each other by 360/3 degrees. Likewise, for the bridge arm group in the second multilevel bridge arm group, within a high frequency period, a phase of a high frequency drive signal of the first bridge arm F1 deviates from a phase of a high frequency drive signal of the second bridge arm F2 by 360/3 degrees, and a phase of a high frequency drive signal of the second bridge arm F2 deviates from a phase of a high frequency drive signal of the third bridge arm F3 by 360/3 degrees, that is, phases of on-off states of switching transistors of two adjacent bridge arms among the first bridge arm F1, the second bridge arm F2, and the third bridge arm F3 also deviate from each other by 360/3 degrees. The phase of the high frequency drive signal of the first bridge arm E1 deviates from the phase of the high frequency drive signal of the first bridge arm F1 by 360/6 degrees, the phase of the high frequency drive signal of the second bridge arm E2 deviates from the phase of the high frequency drive signal of the second bridge arm F2 by 360/6 degrees, and the phase of the high frequency drive signal of the third bridge arm E3 deviates from the phase of the high frequency drive signal of the third bridge arm F3 by 360/6 degrees. Within a working frequency period, phases of high frequency drive signals of the first multilevel bridge arm group 101 and the second multilevel bridge arm group 102 deviate from each other by 180 degrees, so that phases of level signals input to the first multilevel bridge arm group 101 and the second multilevel bridge arm group 102 deviate from each other by 180 degrees, and then transformation is performed on 13 level signals received by the converting unit 10 and the direct current with at least three levels is output. The high frequency period is a period of a high frequency drive signal, and the working frequency period is an alternating current working frequency period of alternating currents input by the first multilevel bridge arm group and the second multilevel bridge arm group. According to different states of a duty cycle, the bridge arm groups may output different level signals, where the duty cycle is a ratio of duration of a positive pulse to a whole pulse period in a periodic pulse sequence.

Figure 11:
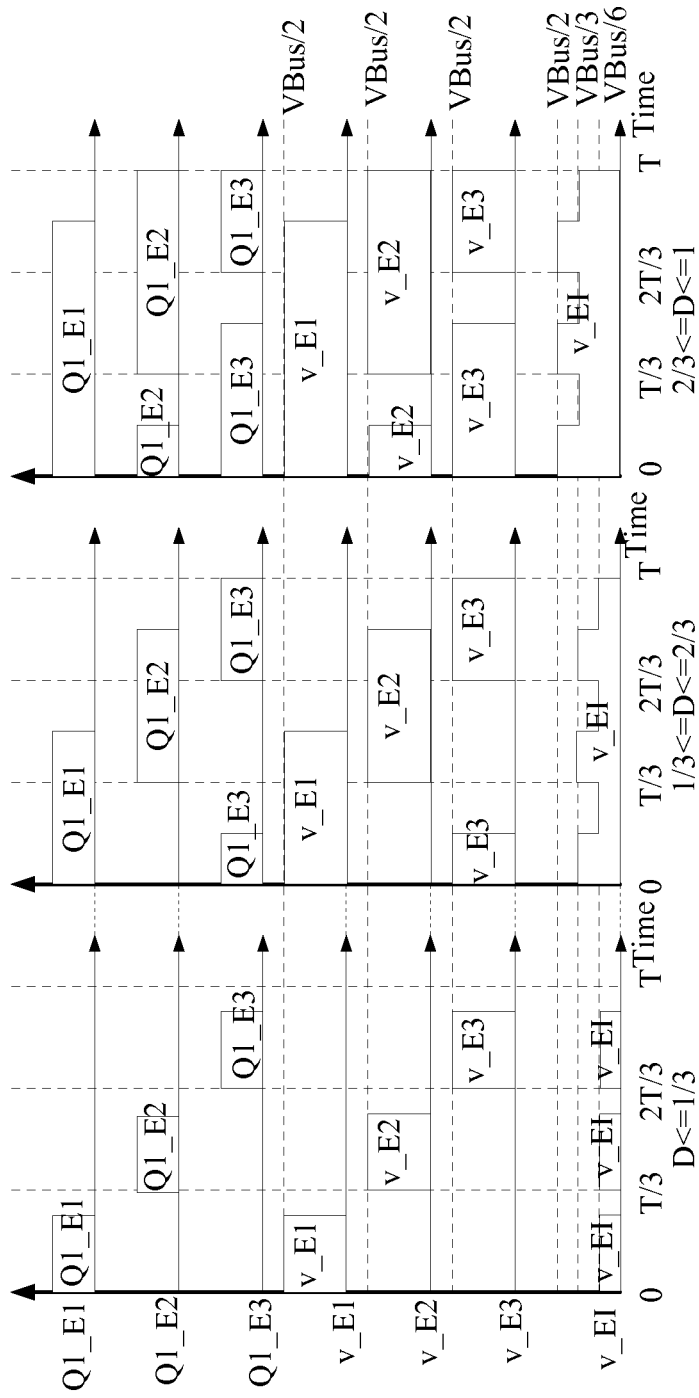
FIG. 11 is a schematic diagram of an output voltage of another multilevel converter according to an embodiment of the present invention.

For example, a positive half period is used as an example, as shown in FIG. 11, when a duty cycle D≤⅓, assuming that when a VBus/6 level signal, that is, V_E1 is VBus/6, is input to the first multilevel bridge arm group, and when the first switching transistor Q1_E1 of the first bridge arm E1 is on, the second switching transistor Q2_E1 is on, and the third switching transistor Q3_E1 and the fourth switching transistor Q4_E1 are cut-off, the first switching transistor Q1_E2 of the second bridge arm E2 is disconnected, the second switching transistor Q2_E2 and the third switching transistor Q3_E2 are connected, and the fourth switching transistor Q4_E2 is cut-off, and the first switching transistor Q1_E3 of the third bridge arm E3 is disconnected, the second switching transistor Q2_E3 and the third switching transistor Q3_E3 are connected, and the fourth switching transistor Q4_E3 is cut-off, and then the first multilevel bridge arm group outputs a (VBus/6)×3=VBus/2 level signal; and a level in a connection wire V_E1 between the first bridge arm E1 and the coupled inductor is VBus/2, a level in a connection wire V_E2 between the second bridge arm E2 and the coupled inductor is Bus_N, and a level in a connection wire V_E3 between the third bridge arm E3 and the coupled inductor is Bus_N.

Likewise, because phases of on-off states of switching transistors of two adjacent bridge arms deviate from each other by 360/3 degrees, when a VBus/6 level signal, that is, V_EI is VBus/6, is input to the first multilevel bridge arm group, and when the first switching transistor Q1_E2 of the second bridge arm E2 is on, the second switching transistor Q2_E2 is on, and the third switching transistor Q3_E2 and the fourth switching transistor Q4_E2 are cut-off, the first switching transistor Q1_E1 of the first bridge arm E1 is disconnected, the second switching transistor Q2_E1 and the third switching transistor Q3_E1 are connected, and the fourth switching transistor Q4_E1 is cut-off, and the first switching transistor Q1_E3 of the third bridge arm E3 is disconnected, the second switching transistor Q2_E3 and the third switching transistor Q3_E3 are connected, and the fourth switching transistor Q4_E3 is cut-off, the first multilevel bridge arm group outputs a (VBus/6)×3=VBus/2 level signal; and the connection wire V_E2 between the second bridge arm E2 and the coupled inductor may input VBus/2, the connection wire V_E1 between the first bridge arm E1 and the coupled inductor may input Bus_N, and the connection wire V_E3 between the third bridge arm E3 and the coupled inductor may input Bus_N.

Likewise, when a VBus/6 level signal, that is, V_E1 is VBus/6, is input to the first multilevel bridge arm group, and when the first switching transistor Q1_E3 of the third bridge arm E3 is on, the second switching transistor Q2_E3 is on, and the third switching transistor Q3_E3 and the fourth switching transistor Q4_E3 are cut-off, the first switching transistor Q1_E1 of the first bridge arm E1 is disconnected, the second switching transistor Q2_E1 and the third switching transistor Q3_E1 are connected, and the fourth switching transistor Q4_E1 is cut-off, and the first switching transistor Q1_E2 of the second bridge arm E2 is disconnected, the second switching transistor Q2_E2 and the third switching transistor Q3_E2 are connected, and the fourth switching transistor Q4_E2 is cut-off, the first multilevel bridge arm group outputs a (VBus/6)×3=VBus/2 level signal; and the connection wire V_E3 between the third bridge arm E3 and the coupled inductor may input VBus/2, the connection wire V_E1 between the first bridge arm E1 and the coupled inductor may input Bus_N, and the connection wire V_E2 between the second bridge arm E2 and the coupled inductor may input Bus_N.

When $1/3 \le$ the duty cycle $D \le 2/3$, assuming that when a VBus/3 level signal, that is, V_EI is VBus/3, is input to the first multilevel bridge arm group, and when the first switching transistor Q1_E1 of the first bridge arm E1 is on, the second switching transistor Q2_E1 is on, and the third switching transistor Q3_E1 and the fourth switching transistor Q4_E1 are cut-off, the first switching transistor Q1_E2 of the second bridge arm E2 is on, the second switching transistor Q2_E2 is on, and the third switching transistor Q3_E2 and the fourth switching transistor Q4_E2 are cut-off, and the first switching transistor Q1_E3 of the third bridge arm E3 is disconnected, the second switching transistor Q2_E3 and the third switching transistor Q3_E3 are connected, and the fourth switching transistor Q4_E3 is cut-off, the first multilevel bridge arm group outputs a (VBus/3)×3=VBus level signal; and the connection wire V_E1 between the first bridge arm E1 and the coupled inductor may input VBus/2, the connection wire V_E2 between the second bridge arm E2 and the coupled inductor may input VBus/2, and the connection wire V_E3 between the third bridge arm E3 and the coupled inductor may input Bus_N.

Likewise, because phases of on-off states of switching transistors of two adjacent bridge arms deviate from each other by 360/3 degrees, when a VBus/3 level signal, that is, V_EI is VBus/3, is input to the first multilevel bridge arm group, and when the first switching transistor Q1_E2 of the second bridge arm E2 and the first switching transistor Q1_E3 of the third bridge arm E3 are connected at the same time, that is, the first switching transistor Q1_E2 of the second bridge arm E2 is on, the second switching transistor Q2_E2 is on, and the third switching transistor Q3_E2 and the fourth switching transistor Q4_E2 are cut-off, the first switching transistor Q1_E3 of the third bridge arm E3 is on, the second switching transistor Q2_E3 is on, and the third switching transistor Q3_E3 and the fourth switching transistor Q4_E3 are cut-off, and the first switching transistor Q1_E1 of the first bridge arm E1 is disconnected, the second switching transistor Q2_E1 and the third switching transistor Q3_E1 are connected, and the fourth switching transistor Q4_E1 is cut-off, the first multilevel bridge arm group outputs a (VBus/3)×3=VBus level signal; and the connection wire V_E2 between the second bridge arm E2 and the coupled inductor may input VBus/2, the connection wire V_E3 between the third bridge arm E3 and the coupled inductor may input VBus/2, and the connection wire V_E1 between the first bridge arm E1 and the coupled inductor may input Bus_N.

Likewise, when a VBus/3 level signal, that is, V_EI is VBus/3, is input to the first multilevel bridge arm group, and when the first switching transistor Q1_E3 of the third bridge arm E3 and the first switching transistor Q1_E1 of the first bridge arm E1 are connected at the same time, that is, the first switching transistor Q1_E1 of the first bridge arm E1 is on, the second switching transistor Q2_E1 is on, and the third switching transistor Q3_E1 and the fourth switching transistor Q4_E1 are cut-off, the first switching transistor Q1_E3 of the third bridge arm E3 is on, the second switching transistor Q2_E3 is on, and the third switching transistor Q3_E3 and the fourth switching transistor Q4_E3 are cut-off, and the first switching transistor Q1_E2 of the second bridge arm E2 is disconnected, the second switching transistor Q2_E2 and the third switching transistor Q3_E2 are connected, and the fourth switching transistor Q4_E2 is cut-off, the first multilevel bridge arm group outputs a (VBus/3)×3=VBus level signal; and the connection wire V_E1 between the first bridge arm E1 and the coupled inductor may input VBus/2, the connection wire V_E3 between the third bridge arm E3 and the coupled inductor may input VBus/2, and the connection wire V_E2 between the second bridge arm E2 and the coupled inductor may input Bus_N.

When $2/3 \le$ the duty cycle $D \le 1$, assuming that when a VBus/2 level signal, that is, V_EI is VBus/2, is input to the first multilevel bridge arm group, and when the first switching transistor Q1_E1 of the first bridge arm E1 is on, the second switching transistor Q2_E1 is on, and the third switching transistor Q3_E1 and the fourth switching transistor Q4_E1 are cut-off, the first switching transistor Q1_E2 of the second bridge arm E2 is on, the second switching transistor Q2_E2 is on, and the third switching transistor Q3_E2 and the fourth switching transistor Q4_E2 are cut-off, and the first switching transistor Q1_E3 of the third bridge arm E3 is on, the second switching transistor Q2_E3 is on, and the third switching transistor Q3_E3 and the fourth switching transistor Q4_E3 are cut-off, the first multilevel bridge arm group outputs a (VBus/2)×3=3VBus/2 level signal; and the connection wire V_E1 between the first bridge arm E1 and the coupled inductor may input VBus/2, the connection wire V_E2 between the second bridge arm E2 and the coupled inductor may input VBus/2, and the connection wire V_E3 between the third bridge arm E3 and the coupled inductor may input VBus/2.

With a positive half period, when a VBus/6, VBus/3, or VBus/2 level signal is input to the first multilevel bridge arm group, the first multilevel bridge arm group may output a VBus/2 level signal; likewise, within a negative half period, when a −VBus/6, −VBus/3, or −VBus/2 level signal is input to the first multilevel bridge arm group, the first multilevel bridge arm group may output a −VBus/2 level signal; and when V_E1, V_E2, and V_E3 output Bus_N at the same time, the first multilevel bridge arm group may output 0V. Therefore, in the working frequency period, the first multilevel bridge arm group may output three level signals VBus/2, −VBus/2, and Bus_N.

Figure 12A:
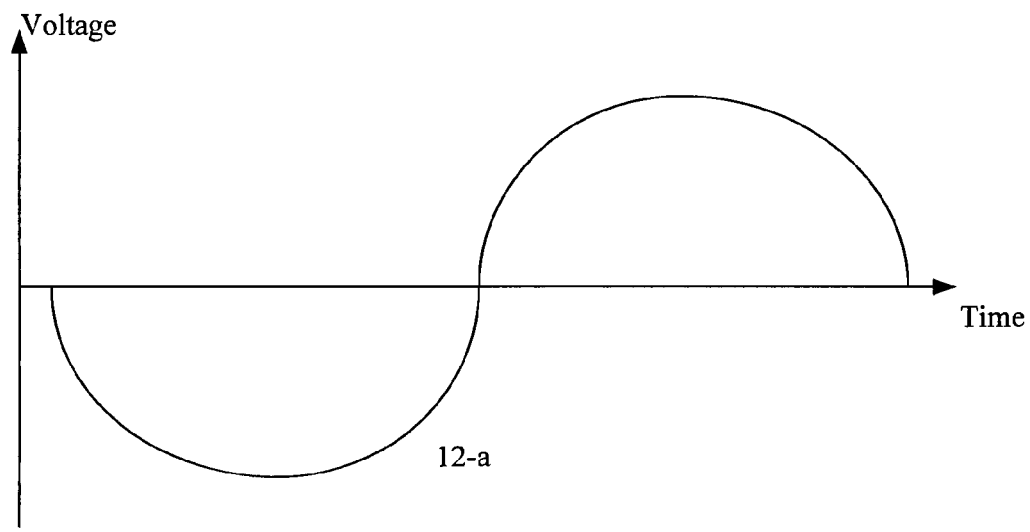
FIG. 12A is a waveform diagram of a voltage in still another multilevel converter according to an embodiment of the present invention.
Figure 12B:
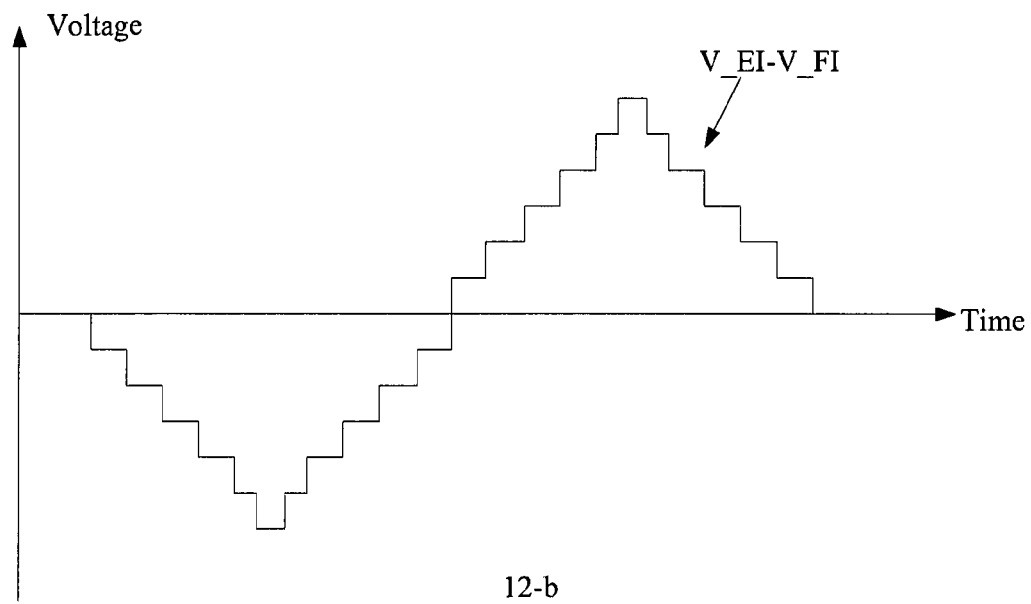
FIG. 12B is a waveform diagram of a voltage in yet another multilevel converter according to an embodiment of the present invention.

A structure of the second multilevel bridge arm group is the same as a structure of the first multilevel bridge arm group and devices at a same position have a same function. Likewise, the second multilevel bridge arm group may also output three level signals VBus/2, −VBus/2, and Bus_N. In this way, as shown in FIGS. 12A and 12B, the alternating current input by the alternating current inputting unit, as a sine wave shown in FIG. 12A, is filtered by using the isolation transformer and the capacitor of the filtering unit, and an input waveform V_EI-V_FI, shown in FIG. 12B, of the first multilevel bridge arm group and the second multilevel bridge arm group is obtained. In FIGS. 12A and 12B, the horizontal axis represents time t and the vertical axis represents voltage v.

Figure 13:
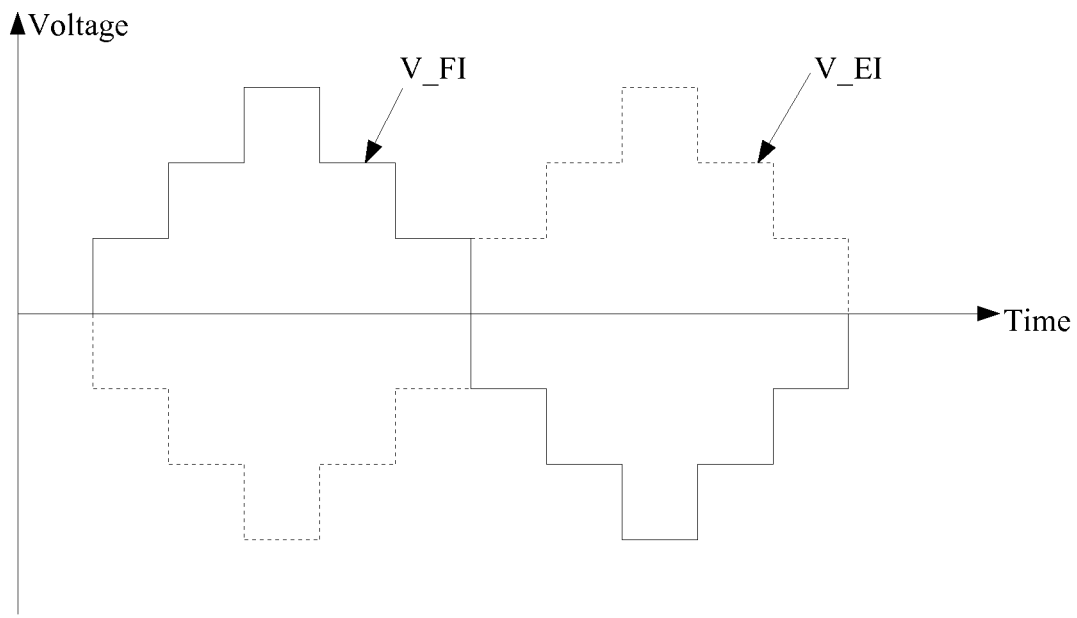
FIG. 13 is a waveform diagram of a voltage in yet another multilevel converter according to an embodiment of the present invention.

Further, as shown in FIG. 13, the isolation transformer of the filtering unit performs voltage transformation on input alternating currents of the first multilevel bridge arm group and the second multilevel bridge arm group, so that an input waveform of the first multilevel bridge arm group deviates from an input waveform of the second multilevel bridge arm group by 180 degrees, and then the converting unit is enabled to transform received 2[(3−1)×3]+1=13 level signals and a direct current of three levels is output; and then, the voltage dividing unit transforms the direct current of three levels output by the converting unit into a direct current with two levels, and outputs the direct current. In FIG. 13, the horizontal axis represents time t and the vertical axis represents voltage v.

In a practical application, when three converting units and three filtering units are disposed in the multilevel converter, the multilevel converter may be applied to a three-phase system, that is, the multilevel converter may be connected to an alternating current power supply and converts an input alternating current into a direct current, so as to supply the direct current to a load.

Figure 14:
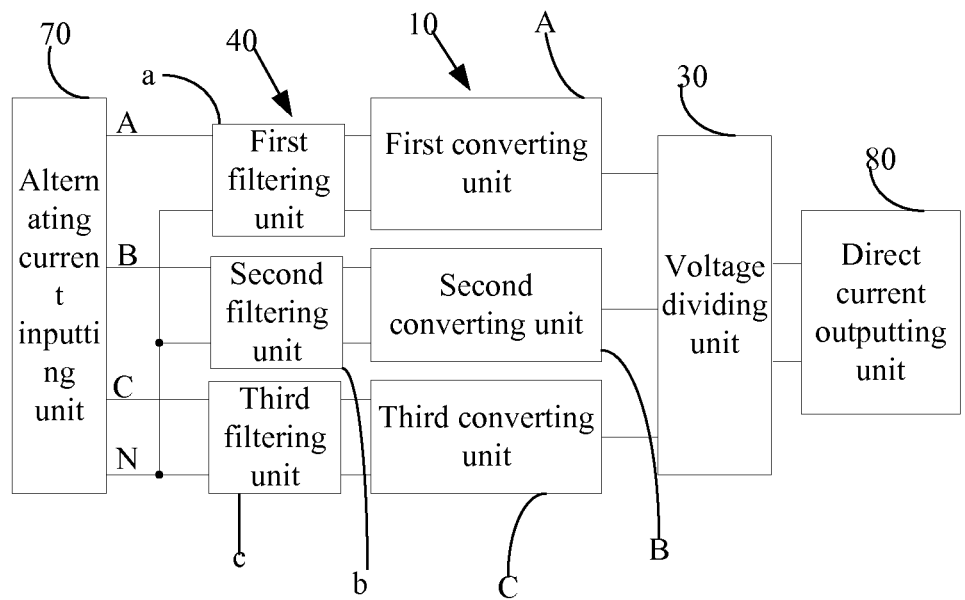
FIG. 14 is a schematic structural diagram of yet another multilevel converter according to an embodiment of the present invention.

For example, assuming that three converting units and three filtering units are disposed in the multilevel converter in the embodiment of the present invention, and as shown in FIG. 14, the multilevel converter includes an alternating current inputting unit 70, a voltage dividing unit 30, three converting units 10, three filtering units 40, and a direct current outputting unit 80, where the direct current outputting unit 80 is configured to output a direct current. The three converting units include a first converting unit A, a second converting unit B, and a third converting unit C; and the three filtering units include a first filtering unit a, a second filtering unit b, and a third filtering unit c.

Input ends of the three filtering units 40 are each connected to an output end of the alternating current inputting unit 70; an output end of the first filtering unit a is connected to an input end of the first converting unit A, an output end of the second filtering unit b is connected to an input end of the second converting unit B, and an output end of the third filtering unit c is connected to an input end of the third converting unit C; output ends of the three converting units 10 are separately connected to an input ends of the voltage dividing unit 30; and an output end of the voltage dividing unit 30 is connected to an input end of the direct current outputting unit 80.

It should be noted that input ends of the three filtering units of the multilevel converter may include a neutral wire, that is, a phase wire A of the first filtering unit a inputs an alternating current to the first converting unit A, a phase wire B of the second filtering unit b inputs an alternating current to the second converting unit B, a phase wire C of the third filtering unit c inputs an alternating current to the third converting unit C, and the other phase wire of the first filtering unit a, the other phase wire of the second filtering unit b, and the other phase wire of the third filtering unit c are connected at a neutral wire N. A voltage between any two of the phase wire A, the phase wire B, and the phase wire C is 380V, and a voltage between the neutral wire N and each of the phase wire A, the phase wire B, and the phase wire C is 220V. The neutral wire is used to make various phase voltages that are input by the multilevel converter approximately symmetric, and has a protective function to a load to which the multilevel converter is on, that is, when a open circuit or short circuit occurs in any phase of the phase wire A, the phase wire B, and the phase wire C, and an input voltage abruptly increases or decreases, the neutral wire balances voltages of the other two phases, so as to avoid damaging the load.

If the input ends of the three filtering units of the multilevel converter do not include a neutral wire, a Y-shaped or Δ-shaped connection manner may be used for the input ends of the filtering units.

Figure 15:
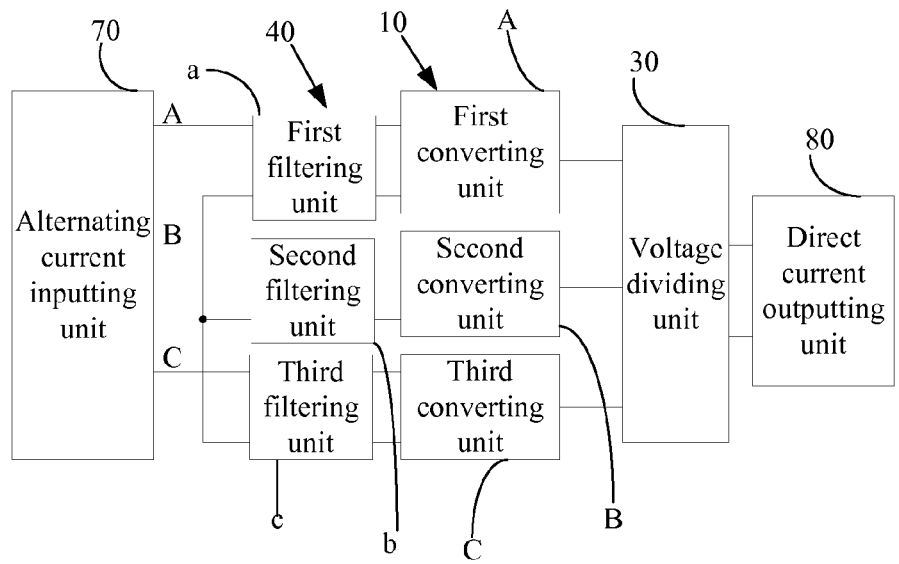
FIG. 15 is a schematic structural diagram of yet another multilevel converter according to an embodiment of the present invention.

As shown in FIG. 15, a Y-shaped connection manner used for the input ends of the filtering units is that the phase wire A of the first filtering unit a inputs an alternating current to the first converting unit A, the phase wire B of the second filtering unit b inputs an alternating current to the second converting unit B, the phase wire C of the third filtering unit c inputs an alternating current to the third converting unit C, and the other phase wire of the first filtering unit a, the other phase wire of the second filtering unit b, and the other phase wire of the third filtering unit c are connected at a point.

Figure 16:
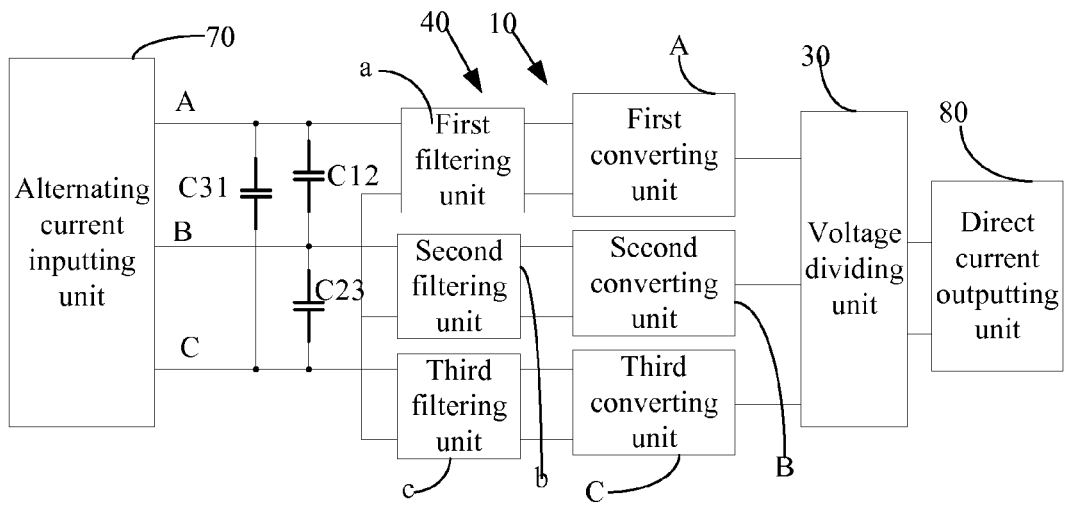
FIG. 16 is a schematic structural diagram of yet another multilevel converter according to an embodiment of the present invention.

As shown in FIG. 16, a Δ-shaped connection manner that may be used for the input ends of the filtering units is that the phase wire A is connected to the phase wire B and the phase wire C, the phase wire B is connected to the phase wire A and the phase wire C, and the phase wire C is connected to the phase wire B and the phase wire A, that is, any two of the phase wire A, the phase wire B, and the phase wire C are connected to form a Δ shape, and the other phase wire of the first filtering unit a, the other phase wire of the second filtering unit b, and the other phase wire of the third filtering unit c separately hang in the air.

Especially, phases of alternating currents input by all converting units deviate from each other by 120 degrees, so as to supply the alternating currents to a load. The multilevel converter in this embodiment of the present invention may also be applied to another multi-phase system, and a working principle is the same as that of the multilevel converter in this embodiment of the present invention, which is not described herein again.

An embodiment of the present invention provides a power supply system, and the system includes a load and a multilevel converter, where the multilevel converter is configured to convert an alternating current into a direct current or convert a direct current into an alternating current, so as to supply the direct current or the alternating current to the load.

Figure 17:
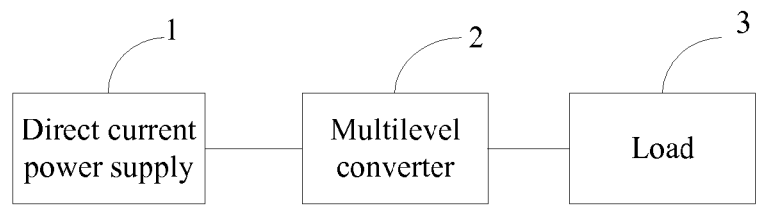
FIG. 17 is a schematic structural diagram of yet another multilevel converter according to an embodiment of the present invention.

Assuming that the multilevel converter is configured to convert a direct current into an alternating current, as shown in FIG. 17, the system includes a direct current power supply 1, a multilevel converter 2, and a load 3, where the multilevel converter is configured to convert a direct current into an alternating current, so as to supply the alternating current to the load 3. An output end of the direct current power supply 1 is connected to an input end of the multilevel converter 2, and an output end of the multilevel converter 2 is connected to the load 3.

Figure 18:
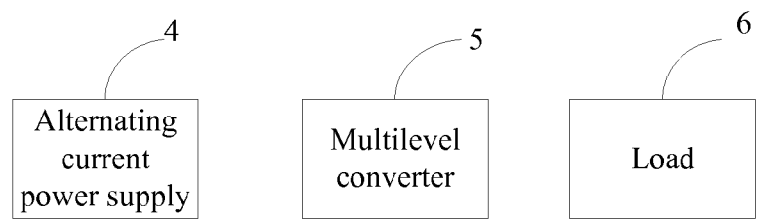
FIG. 18 is a schematic structural diagram of yet another multilevel converter according to an embodiment of the present invention.

Assuming that when the multilevel converter is configured to convert an alternating current into a direct current, as shown in FIG. 18, the system includes an alternating current power supply 4, a multilevel converter 5, and a load 6, where the multilevel converter is configured to convert an alternating current into a direct current, so as to supply the direct current to the load 6. An output end of the alternating current power supply 4 is connected to an input end of the multilevel converter 5, and an output end of the multilevel converter 5 is connected to the load 6.

Figure 19:
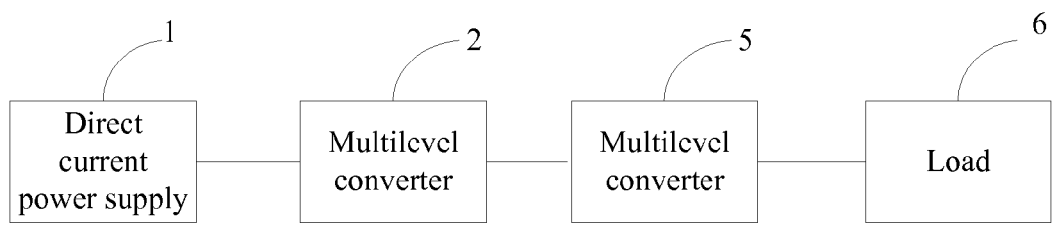
FIG. 19 is a schematic structural diagram of yet another multilevel converter according to an embodiment of the present invention.
Figure 20:
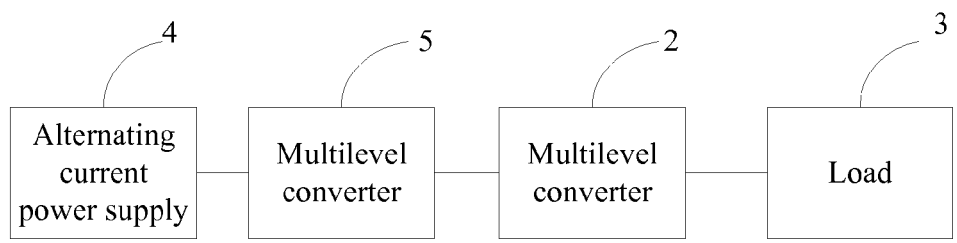
FIG. 20 is a schematic structural diagram of yet another multilevel converter according to an embodiment of the present invention.

Assuming that when the output end of the multilevel converter 2 is connected to the input end of the multilevel converter 5, it may be implemented that a direct current is converted into a direct current, so as to supply the direct current to the load 6. As shown in FIG. 19, the system includes a direct current power supply 1, a multilevel converter 2, a multilevel converter 5, and a load 6. An output end of the direct current power supply 1 is connected to an input end of the multilevel converter 2, an output end of the multilevel converter 2 is connected to an input end of the multilevel converter 5, and an output end of the multilevel converter 5 is connected to the load 6.

Alternatively, when the output end of the multilevel converter 5 is connected to the input end of the multilevel converter 2, it may be implemented that an alternating current is converted into an alternating current, so as to supply the alternating current to the load 3. As shown in FIG.

20, the system includes an alternating current power supply 4, a multilevel converter 5, a multilevel converter 2, and a load 3. An output end of the alternating current power supply 4 is connected to an input end of the multilevel converter 5, an output end of the multilevel converter 5 is connected to an input end of the multilevel converter 2, and an output end of the multilevel converter 2 is connected to the load 3.

It may be clearly understood by a person skilled in the art that, for the purpose of convenient and brief description, for a detailed working process of the foregoing system, apparatus, and unit, reference may be made to a corresponding process in the foregoing method embodiments, which is not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on multiple network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit. The integrated unit may be implemented through hardware, or may be implemented in a form of software functional unit.

A person of ordinary skill in the art may understand that all or a part of the steps of the methods in the embodiments may be implemented by a program instructing relevant hardware. The program may be stored in a computer readable storage medium. When the program runs, the steps of the methods in the embodiments are performed. The foregoing storage medium includes any medium that can store program code, such as a read-only memory (ROM), a random-access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention is subject to the protection scope of the claims.

What is claimed is:

1. A multilevel converter, comprising:
at least one converting unit, wherein the converting unit comprises two multilevel bridge arm groups connected in parallel, and the two multilevel bridge arm groups comprise a first multilevel bridge arm group and a second multilevel bridge arm group, wherein each multilevel bridge arm group comprises a bridge arm group and a coupled inductor, the bridge arm group is connected to the coupled inductor, and the coupled inductor is configured to filter a level signal output by the bridge arm group, wherein the bridge arm group comprises at least N interleaved parallel bridge arms, and each bridge arm is connected to the coupled inductor, wherein N is an integer greater than or equal to 3, wherein within a high frequency period, a phase of a high frequency drive signal of each bridge arm in the bridge arm group deviates, by 360/N degrees, from a phase of a high frequency drive signal of a bridge arm adjacent to each bridge arm, and a phase of a high frequency drive signal of each bridge arm in the first multilevel bridge arm group deviates, by 360/2N degrees, from a phase of a high frequency drive signal of a bridge arm that is in the second multilevel bridge arm group and corresponding to each bridge arm in the first multilevel arm group, and wherein within an industrial frequency period, phases of high frequency drive signals of the two multilevel bridge arm groups that are connected in parallel deviate from each other by 180 degrees such that phases of level signals output by the two multilevel bridge arm groups that are connected in parallel deviate from each other by 180 degrees, and then the converting unit is enabled to output $2[(M-1)\times N]+1$ level signals, wherein M is the number of levels received by the converting unit and M is an integer greater than or equal to 3;
a direct current inputting unit configured to input a direct current and supply the direct current to the converting unit;
a voltage dividing unit configured to divide the direct current supplied by the direct current inputting unit into a direct current with at least three levels, wherein an input end of the voltage diving unit is connected to an output end of the direct current inputting unit and an output end of the voltage dividing unit is connected to an input end of each converting unit, and the output end of the voltage dividing unit is connected to an input end of each bridge arm in each converting unit; and
at least one filtering unit configured to perform voltage transformation to transform the level signals output by the converting unit into an alternating current, and perform filtering on the alternating current and output the alternating current, wherein an input end of each filtering unit is connected to an output end of a different converting unit, and the filtering unit is connected to the converting unit in series.

2. The multilevel converter according to claim 1, wherein each bridge arm comprises at least one switching transistor, and the switching transistor is a power device.

3. The multilevel converter according to claim 2, wherein the filtering unit comprises an isolation transformer and a capacitor, wherein the isolation transformer is configured to perform voltage transformation to transform the level signals output by the converting unit into the alternating current, and perform filtering, by using leakage inductance of the isolation transformer, on the level signals output by the converting unit and perform filtering on the alternating current by using the capacitor.

4. The multilevel converter according to claim 2, wherein the filtering unit comprises an isolation transformer and a passive power filter, wherein the isolation transformer is configured to perform voltage transformation to transform the level signals output by the converting unit into the alternating current, and perform filtering, by using leakage inductance of the isolation transformer, on the level signals output by the converting unit and perform filtering on the alternating current by using the passive power filter.

5. A multilevel converter, comprising:
at least one converting unit, wherein the converting unit comprises two multilevel bridge arm groups connected in parallel, and the two multilevel bridge arm groups comprise a first multilevel bridge arm group and a second multilevel bridge arm group, wherein each multilevel bridge arm group comprises a bridge arm group and a coupled inductor, the bridge arm group is connected to the coupled inductor, and the coupled inductor is configured to perform filtering on a level signal input to the bridge arm group, wherein the bridge arm group comprises at least N interleaved parallel bridge arms, and each bridge arm is connected to the coupled inductor, wherein N is an integer greater than or equal to 3, wherein within a high frequency period, a phase of a high frequency drive signal of each bridge arm in the bridge arm group deviates, by 360/N degrees, from a phase of a high frequency drive signal of a bridge arm adjacent to each bridge arm, and a phase of a high frequency drive signal of each bridge arm in the first multilevel bridge arm group deviates, by 360/2N degrees, from a phase of a high frequency drive signal of a bridge arm that is in the second multilevel bridge arm group and corresponding to each bridge arm in the first multilevel arm group, and wherein within a working frequency period, phases of high frequency drive signals of the two multilevel bridge arm groups that are connected in parallel deviate from each other by 180 degrees such that phases of level signals input to the two multilevel bridge arm groups that are connected in parallel deviate from each other by 180 degrees, and then transformation is performed on $2[(M-1)\times N]+1$ level signals received by the converting unit and a direct current with at least three levels is output, wherein M is the number of levels output by the converting unit and M is an integer greater than or equal to 3;
an alternating current inputting unit configured to input an alternating current and supply the alternating current to the converting unit;
at least one filtering unit configured to perform voltage transformation to transform the alternating current input by the alternating current inputting unit into a level signal, and perform filtering on the alternating current and output the level signal to the converting unit, wherein an input end of each filtering unit is connected to an output end of the alternating current inputting unit, an output end of each filtering unit is connected to an input end of a converting unit, and the filtering unit is connected to the converting unit in series;
a voltage dividing unit configured to transform the direct current with at least three levels that is output by the converting unit into a direct current with two levels, wherein an input end of the voltage diving unit is connected to an output end of each converting unit, and the input end of the voltage dividing unit is connected to an output end of each bridge arm in each converting unit; and
a direct current outputting unit configured to receive the direct current output by the voltage diving unit and output the direct current, wherein an output end of the voltage dividing unit is connected to an input end of the direct current inputting unit.

6. The multilevel converter according to claim 5, wherein each bridge arm comprises at least one switching transistor, and the switching transistor is a power device.

7. The multilevel converter according to claim 6, wherein the filtering unit comprises an isolation transformer and a capacitor, wherein the isolation transformer is configured to perform voltage transformation to transform the alternating current input by the alternating current inputting unit into a level signal; and perform filtering on the level signal by using leakage inductance of the isolation transformer, perform filtering on the alternating current by using the capacitor, and output the level signal.

8. The multilevel converter according to claim 6, wherein the filtering unit comprises an isolation transformer and a passive power filter, wherein the isolation transformer is configured to perform voltage transformation to transform the alternating current input by the alternating current inputting unit into a level signal; and perform filtering on the level signal by using leakage inductance of the isolation transformer, perform filtering on the alternating current by using the passive power filter, and output the level signal.

9. The multilevel converter according to claim 1, wherein the multilevel converter is comprised in a power supply system wherein the power supply system comprises a load, and wherein the multilevel converter is configured to convert an alternating current into a direct current or convert a direct current into an alternating current to supply the direct current or the alternating current to the load.

10. A multilevel converter, comprising:
at least one converting unit,
wherein the converting unit comprises two multilevel bridge arm groups connected in parallel, and the two multilevel bridge arm groups comprise a first multilevel bridge arm group and a second multilevel bridge arm group,
wherein each multilevel bridge arm group comprises a bridge arm group and a coupled inductor, the bridge arm group is connected to the coupled inductor, and the coupled inductor is configured to filter a level signal output by the bridge arm group,
wherein the bridge arm group comprises at least N interleaved parallel bridge arms, and each bridge arm is connected to the coupled inductor,
wherein N is an integer greater than or equal to 3,
wherein within a high frequency period, a phase of a high frequency drive signal of each bridge arm in the bridge arm group deviates, by 360/N degrees, from a phase of a high frequency drive signal of a bridge arm adjacent to each bridge arm, and a phase of a high frequency drive signal of each bridge arm in the first multilevel bridge arm group deviates, by 360/2N degrees, from a phase of a high frequency drive signal of a bridge arm that is in the second multilevel bridge arm group and corresponding to each bridge arm in the first multilevel arm group,
wherein within an industrial frequency period, phases of high frequency drive signals of the two multilevel bridge arm groups that are connected in parallel deviate from each other by 180 degrees such that phases of level signals output by the two multilevel bridge arm groups that are connected in parallel deviate from each other by 180 degrees, and then the converting unit is enabled to output $2[(M-1)\times N]+1$ level signals, and
wherein M is the number of levels received by the converting unit and M is an integer greater than or equal to 3.

11. The multilevel converter according to claim 10, further comprising:
- a direct current inputting unit configured to input a direct current and supply the direct current to the converting unit;
- a voltage dividing unit; configured to divide the direct current supplied by the direct current inputting unit into a direct current with at least three levels, wherein an input end of the voltage diving unit is connected to an output end of the direct current inputting unit and an output end of the voltage dividing unit is connected to an input end of each converting unit, and the output end of the voltage dividing unit is connected to an input end of each bridge arm in each converting unit; and
- at least one filtering unit; configured to perform voltage transformation to transform the level signals output by the converting unit into an alternating current, and perform filtering on the alternating current and output the alternating current, wherein an input end of each filtering unit is connected to an output end of a different converting unit, and the filtering unit is connected to the converting unit in series.

12. The multilevel converter according to claim 11, wherein each bridge arm comprises at least one switching transistor, and the switching transistor is a power device.

13. The multilevel converter according to claim 12, wherein the filtering unit comprises an isolation transformer and a capacitor, wherein the isolation transformer is configured to perform voltage transformation to transform the level signals output by the converting unit into the alternating current, and perform filtering, by using leakage inductance of the isolation transformer, on the level signals output by the converting unit and perform filtering on the alternating current by using the capacitor.

14. The multilevel converter according to claim 12, wherein the filtering unit comprises an isolation transformer and a passive power filter, wherein the isolation transformer is configured to perform voltage transformation to transform the level signals output by the converting unit into the alternating current, and perform filtering, by using leakage inductance of the isolation transformer, on the level signals output by the converting unit and perform filtering on the alternating current by using the passive power filter.

* * * * *

UNITED STATES PATENT AND TRADEMARK OFFICE
CERTIFICATE OF CORRECTION

| | | |
|---|---|---|
| PATENT NO. | : 9,479,071 B2 | Page 1 of 1 |
| APPLICATION NO. | : 14/662708 | |
| DATED | : October 25, 2016 | |
| INVENTOR(S) | : Lei Shi et al. | |

It is certified that error appears in the above-identified patent and that said Letters Patent is hereby corrected as shown below:

In the Claims

Column 31, Lines 6 and 15, Claim 11 should read:

The multilevel converter according to claim 10, further comprising:
    a direct current inputting unit configured to input a direct current and supply the direct current to the converting unit;
    a voltage dividing unit configured to divide the direct current supplied by the direct current inputting unit into a direct current with at least three levels, wherein an input end of the voltage diving unit is connected to an output end of the direct current inputting unit and an output end of the voltage dividing unit is connected to an input end of each converting unit, and the output end of the voltage dividing unit is connected to an input end of each bridge arm in each converting unit; and
    at least one filtering unit configured to perform voltage transformation to transform the level signals output by the converting unit into an alternating current, and perform filtering on the alternating current and output the alternating current, wherein an input end of each filtering unit is connected to an output end of a different converting unit, and the filtering unit is connected to the converting unit in series.

Signed and Sealed this
Tenth Day of January, 2017

Michelle K. Lee
*Director of the United States Patent and Trademark Office*